United States Patent
Tomizawa

(10) Patent No.: US 10,438,543 B2
(45) Date of Patent: Oct. 8, 2019

(54) LIQUID CRYSTAL DISPLAY APPARATUS

(71) Applicant: Japan Display Inc., Tokyo (JP)

(72) Inventor: Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 81 days.

(21) Appl. No.: 15/823,000

(22) Filed: Nov. 27, 2017

(65) Prior Publication Data

US 2018/0166023 A1 Jun. 14, 2018

(30) Foreign Application Priority Data

Dec. 9, 2016 (JP) .................................. 2016-239595

(51) Int. Cl.
| | |
|---|---|
| *G09G 3/34* | (2006.01) |
| *H04N 5/345* | (2011.01) |
| *H04N 5/343* | (2011.01) |
| *H04N 5/232* | (2006.01) |
| *H04N 5/235* | (2006.01) |
| *H04N 5/353* | (2011.01) |
| *G09G 3/36* | (2006.01) |

(52) U.S. Cl.
CPC ......... *G09G 3/3406* (2013.01); *G09G 3/3611* (2013.01); *G09G 3/3614* (2013.01);
(Continued)

(58) Field of Classification Search
CPC .. G09G 3/3406; G09G 3/3614; G09G 3/3611; G09G 3/3622; G09G 2340/0435;
(Continued)

(56) References Cited

U.S. PATENT DOCUMENTS 10,049,629 B2 * 8/2018 Oh ........................ G09G 3/3648
2008/0068484 A1 * 3/2008 Nam ................... H04N 5/23293
348/333.01
(Continued)

FOREIGN PATENT DOCUMENTS

| | | |
|---|---|---|
| JP | 63-231395 A | 9/1988 |
| JP | 2006064964 A | * 3/2006 |

(Continued)

OTHER PUBLICATIONS

Williams, Rob, "Japan Display Wizards Squeeze 8K Into 17-inch LCD to Crack 510 PPI," Oct. 4, 2015, HotHardware, pp. 1-2 (Year: 2015).*

(Continued)

*Primary Examiner* — Stephen G Sherman
*Assistant Examiner* — Maheen I Javed
(74) *Attorney, Agent, or Firm* — K&L Gates LLP

(57) ABSTRACT

According to one embodiment, a liquid crystal display apparatus includes an image sensor configured to output an image signal when the image sensor is driven in a first mode and a second mode, and a display device configured to display an image on a display panel based on the image signal. The image sensor is configured to output an image signal every first exposure time when the image sensor is driven in the first mode, and to output an image signal every second exposure time when the image sensor is driven in the second mode. The display device is configured to display an image in accordance with progressive drive when the image sensor is driven in the first mode, and to display an image in accordance with interlace drive when the image sensor is driven in the second mode.

11 Claims, 14 Drawing Sheets

(52) U.S. Cl.
CPC ......... *G09G 3/3622* (2013.01); *H04N 5/2351* (2013.01); *H04N 5/23245* (2013.01); *H04N 5/343* (2013.01); *H04N 5/3456* (2013.01); *H04N 5/353* (2013.01); *G09G 2310/0224* (2013.01); *G09G 2320/064* (2013.01); *G09G 2340/0435* (2013.01)

(58) Field of Classification Search
CPC ..... G09G 2320/064; G09G 2310/0224; H04N 5/2351; H04N 5/23245; H04N 5/343; H04N 5/353; G02F 1/133
See application file for complete search history.

(56) References Cited

U.S. PATENT DOCUMENTS

2009/0185082 A1 7/2009 Hashimoto
2010/0026617 A1 2/2010 Su et al.
2013/0063653 A1* 3/2013 Kita .................. H04N 5/23245
                                                            348/362

FOREIGN PATENT DOCUMENTS

| JP | 3871656 B | 1/2007 |
| JP | 2007-102022 A | 4/2007 |
| JP | 2010-39464 A | 2/2010 |
| JP | 5160836 B | 3/2013 |

OTHER PUBLICATIONS

Kato et al., Machine Translation of Foreign Patent Document JP 2006064964 A, Flat Display Apparatus and Display Driving Method for the Same, Mar. 9, 2006, p. 1-7 (Year: 2006).*

* cited by examiner

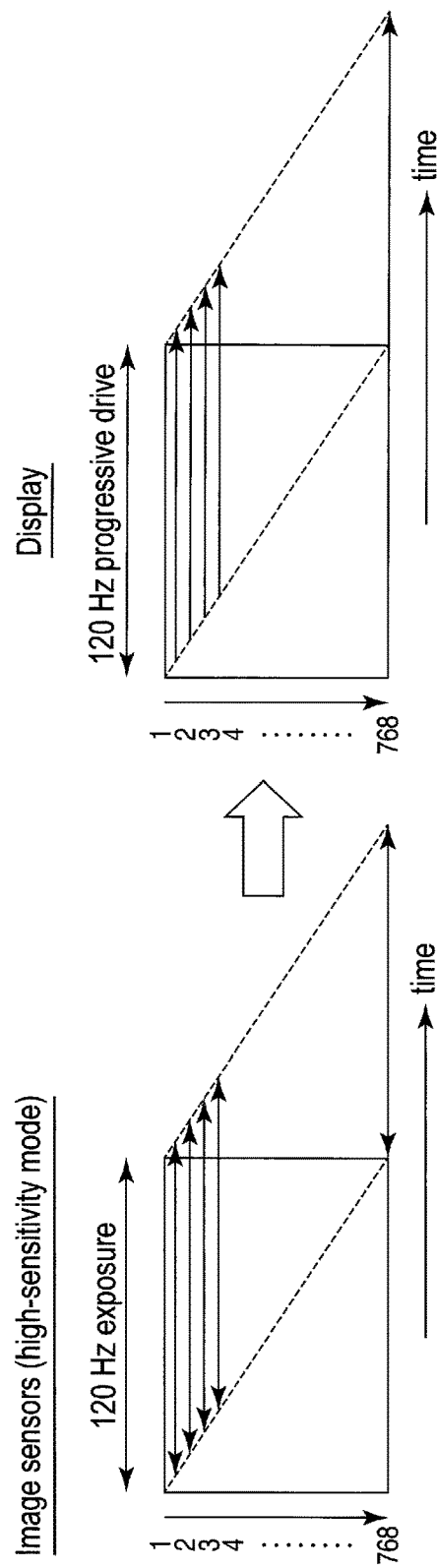
F I G. 3

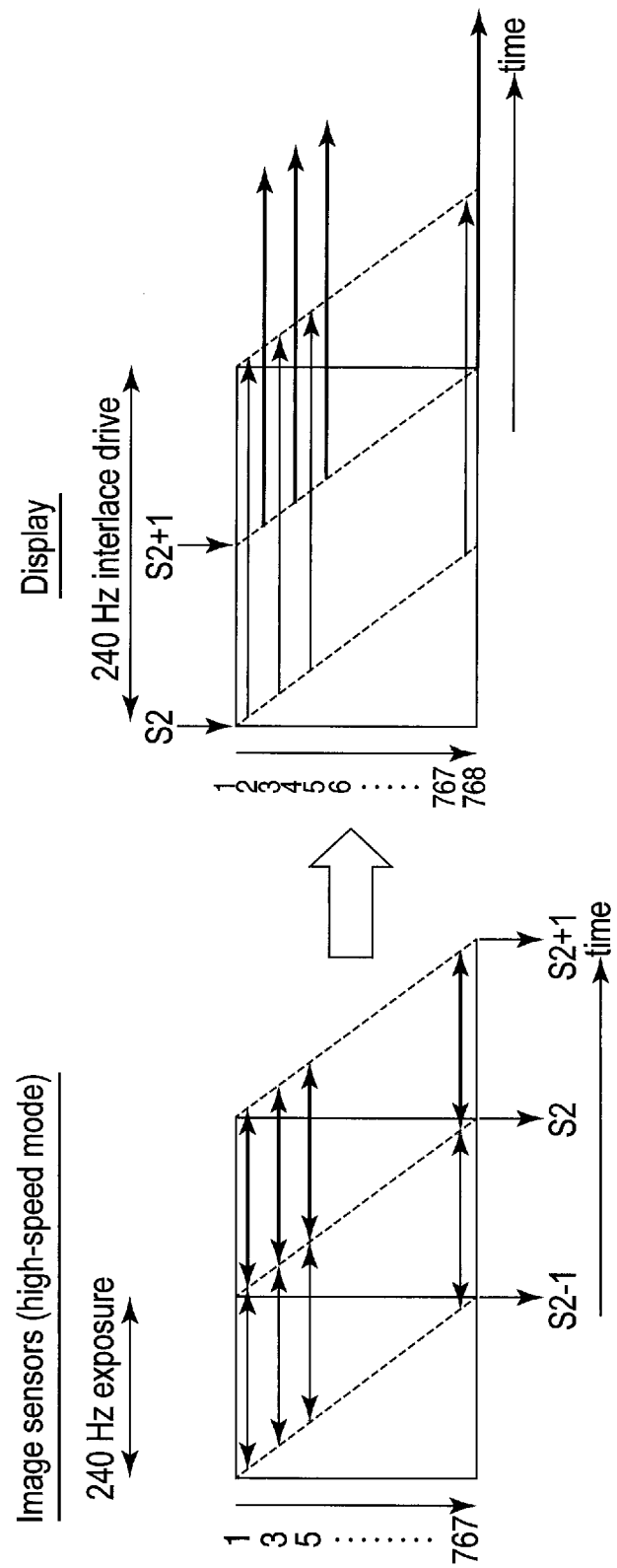
F I G. 14

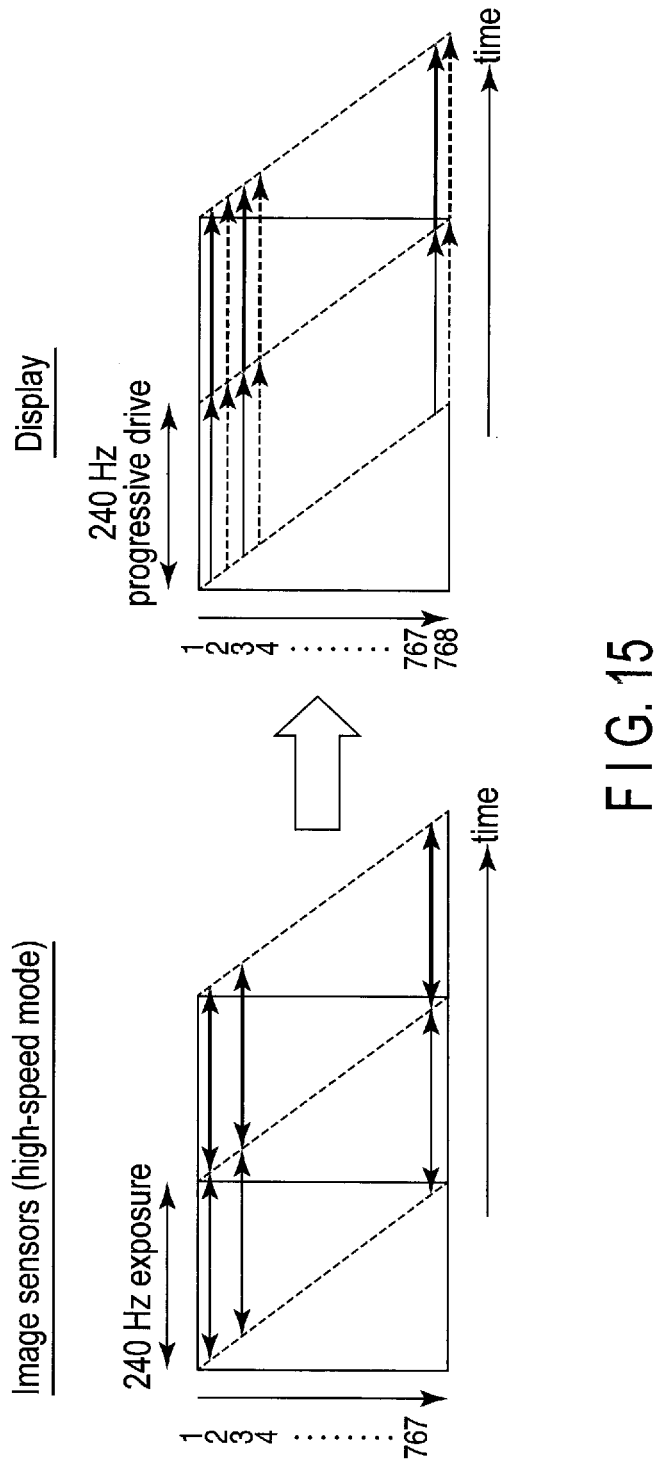
F I G. 15

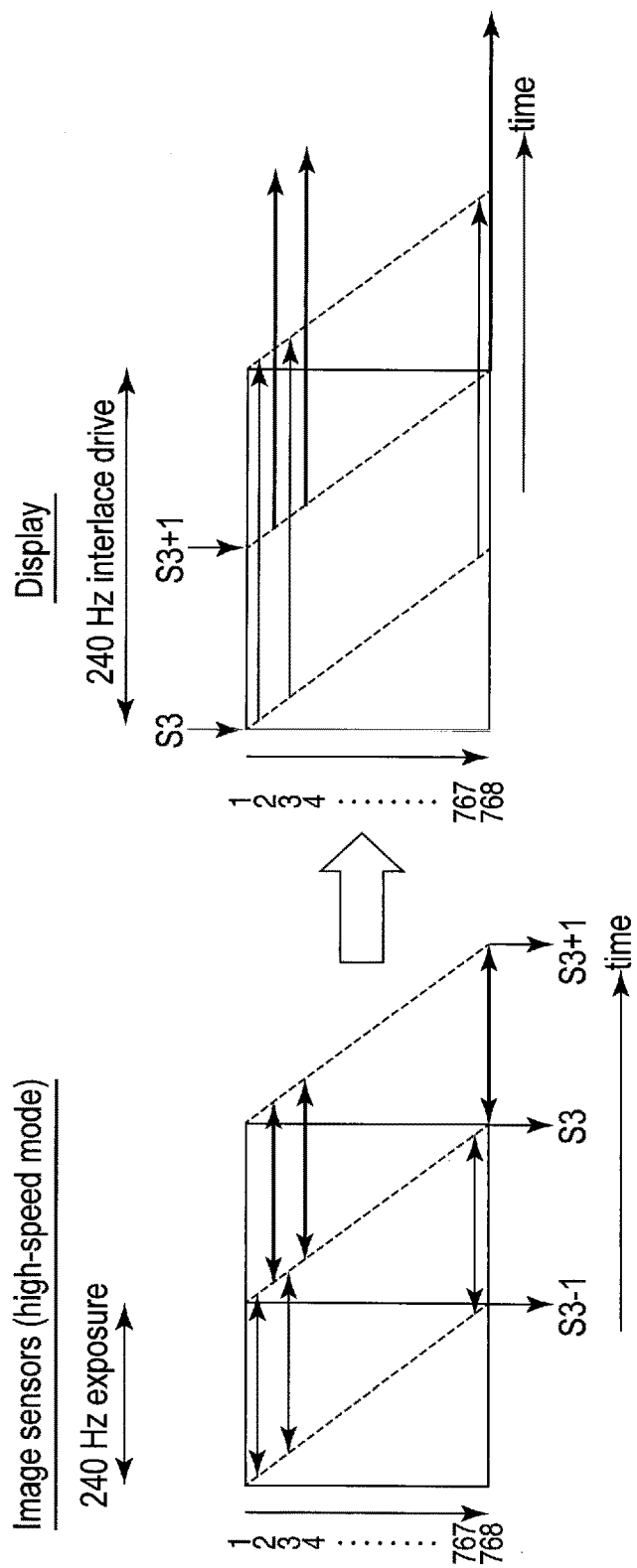
F I G. 16

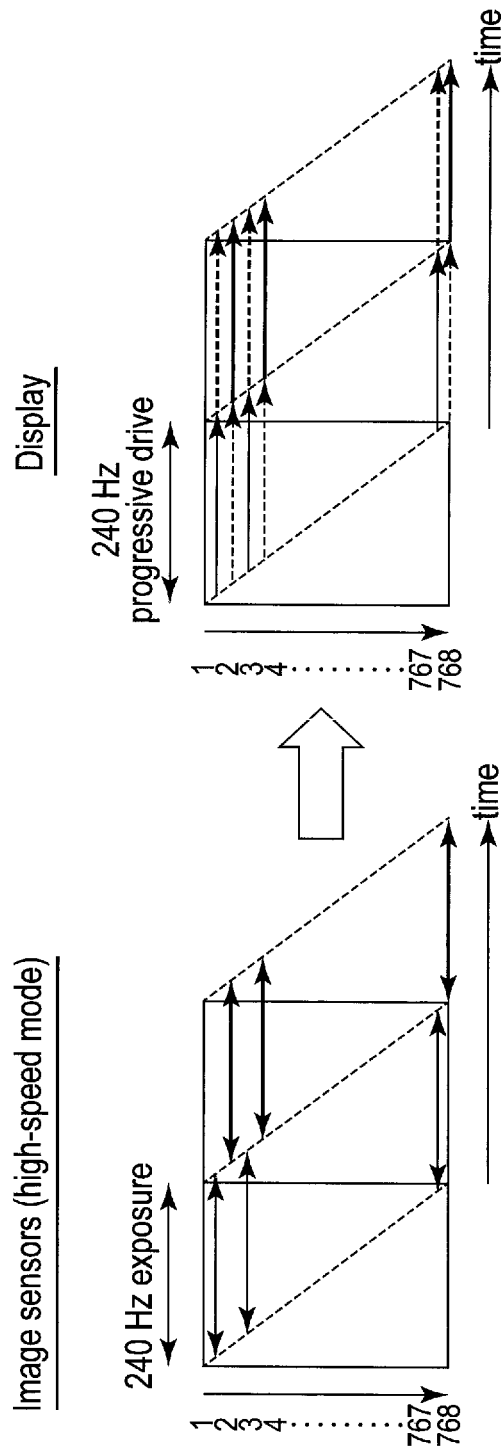
F I G. 17

LIQUID CRYSTAL DISPLAY APPARATUS

CROSS-REFERENCE TO RELATED APPLICATIONS

This application is based upon and claims the benefit of priority from Japanese Patent Application No. 2016-239595, filed Dec. 9, 2016, the entire contents of which are incorporated herein by reference.

FIELD

Embodiments described herein relate generally to a liquid crystal display apparatus.

BACKGROUND

In general, for example, a technology of displaying an image (moving image) on a liquid crystal display apparatus (display) based on an image signal output from an image sensor is known.

For example, the quality of the image displayed on the liquid crystal display apparatus relies on the environment around the image sensor. Therefore, the display control of an image in the liquid crystal display apparatus may be changed in accordance with the environment. In such a case, the display control of an image should be appropriately performed in terms of the load and the image quality of the liquid crystal display apparatus.

SUMMARY

The present disclosure generally relates to a liquid crystal display apparatus.

According to one embodiment, a liquid crystal display apparatus includes an image sensor configured to output an image signal when the image sensor is driven in a first mode and a second mode, and a display device configured to display an image on a display panel based on the image signal. The image sensor is configured to output an image signal every first exposure time when the image sensor is driven in the first mode, and to output an image signal every second exposure time when the image sensor is driven in the second mode. The display device is configured to display an image in accordance with progressive drive when the image sensor is driven in the first mode, and to display an image in accordance with interlace drive when the image sensor is driven in the second mode.

Additional features and advantages are described herein, and will be apparent from the following Detailed Description and the figures.

BRIEF DESCRIPTION OF THE DRAWINGS

FIG. 3 is shown for explaining the display control of an image based on an image signal.

FIG. 14 is shown for explaining 240 Hz interlace drive according to a second embodiment.

FIG. 15 is shown for explaining a comparison example for the present embodiment.

FIG. 16 is shown for explaining 240 Hz interlace drive according to a third embodiment.

FIG. 17 is shown for explaining a comparison example for the present embodiment.

DETAILED DESCRIPTION

Embodiments will be described hereinafter with reference to the accompanying drawings.

In general, according to one embodiment, a liquid crystal display apparatus includes an image sensor and a liquid crystal display device. The image sensor is configured to output an image signal when the image sensor is driven in a first mode and a second mode. The liquid crystal display device includes a liquid crystal display panel including a plurality of display lines. The liquid crystal display device is configured to display an image on the liquid crystal display panel based on the image signal output from the image sensor. The image sensor is configured to output an image signal every first exposure time when the image sensor is driven in the first mode, and to output an image signal every second exposure time shorter than the first exposure time when the image sensor is driven in the second mode. The display device is configured to display an image in accordance with progressive drive which sequentially scans the display lines based on the image signal output from the image sensor when the image sensor is driven in the first mode, and to display an image in accordance with interlace drive which scans the display lines while skipping some of the display lines based on the image signal output from the image sensor when the image sensor is driven in the second mode.

First Embodiment

Figure 1:
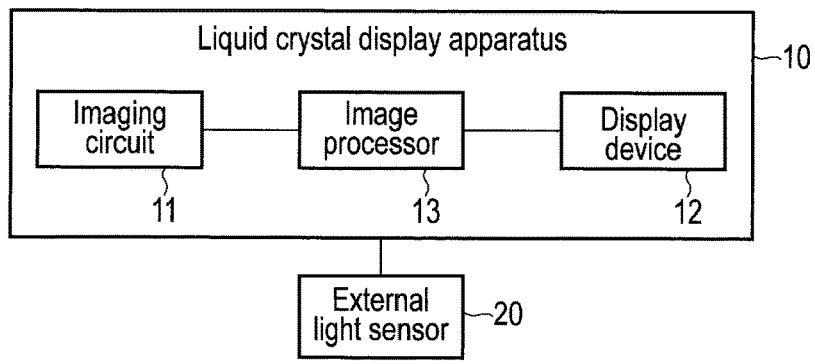
FIG. 1 is a block diagram showing an example of the configuration of a liquid crystal display apparatus according to a first embodiment.

FIG. 1 is a block diagram showing an example of the configuration of a liquid crystal display apparatus according to a first embodiment. As shown in FIG. 1, a liquid crystal display apparatus 10 includes an imaging circuit 11, a display device 12 and an image processor 13.

The imaging circuit 11 includes image sensors (imaging elements) such as CCD image sensors or CMOS image sensors, and captures, for example, an area in front of the imaging circuit 11 (specifically, objects present in the area). In the imaging circuit 11, for example, the image sensors are arrayed in a two-dimensional manner. Each of the image sensors stores the amount of light emitted to the image sensor by exposure as electrical signals. The imaging circuit 11 outputs the electrical signals stored in the image sensors as image signals.

The display device 12 (liquid crystal display device) includes, for example, a liquid crystal display panel, and displays images on the liquid crystal display panel based on the image signals output from the imaging circuit 11 (specifically, from the image sensors included in the imaging circuit 11).

The image processor 13 performs an image process for the image signals output from the imaging circuit 11 to allow the display device 12 to display images.

Although omitted in FIG. 1, the liquid crystal display apparatus 10 further includes, for example, a storage device which stores a program necessary for the process of the liquid crystal display apparatus 10, the image signals output from the imaging circuit 11 or other data.

As shown in FIG. 1, an external light sensor 20 which detects the intensity of light (external light) around the liquid crystal display apparatus 10 (the imaging circuit 11) is electrically connected to the liquid crystal display apparatus 10.

The imaging circuit 11 is (specifically, the image sensors included in the imaging circuit 11 are) configured to operate in a high-sensitivity mode (a first mode) and a high-speed mode (a second mode) as described later. The drive mode of the image sensors is switched (between the high-sensitivity mode and the high-speed mode) based on the intensity of external light detected by the external light sensor 20 (in other words, the lightness or darkness around the imaging circuit 11).

As described above, this specification assumes that the present embodiment is realized as the liquid crystal display apparatus 10 including the elements 11 to 13. However, the present embodiment may be realized as, for example, an image display system including an imaging device (camera) including the imaging circuit 11 and a liquid crystal display apparatus including the display device 12 and the image processor 13. In this case, for example, the image processor 13 may be provided on the imaging device side. Thus, the present embodiment is not limited to a single device such as the liquid crystal display apparatus 10, and may be realized as a combination of a plurality of devices (in other words, as an image display system).

As a matter of course, the external light sensor 20 may be incorporated into the imaging circuit 11. The external light sensor 20 may be incorporated into, for example, the liquid crystal display apparatus 10.

Figure 2:
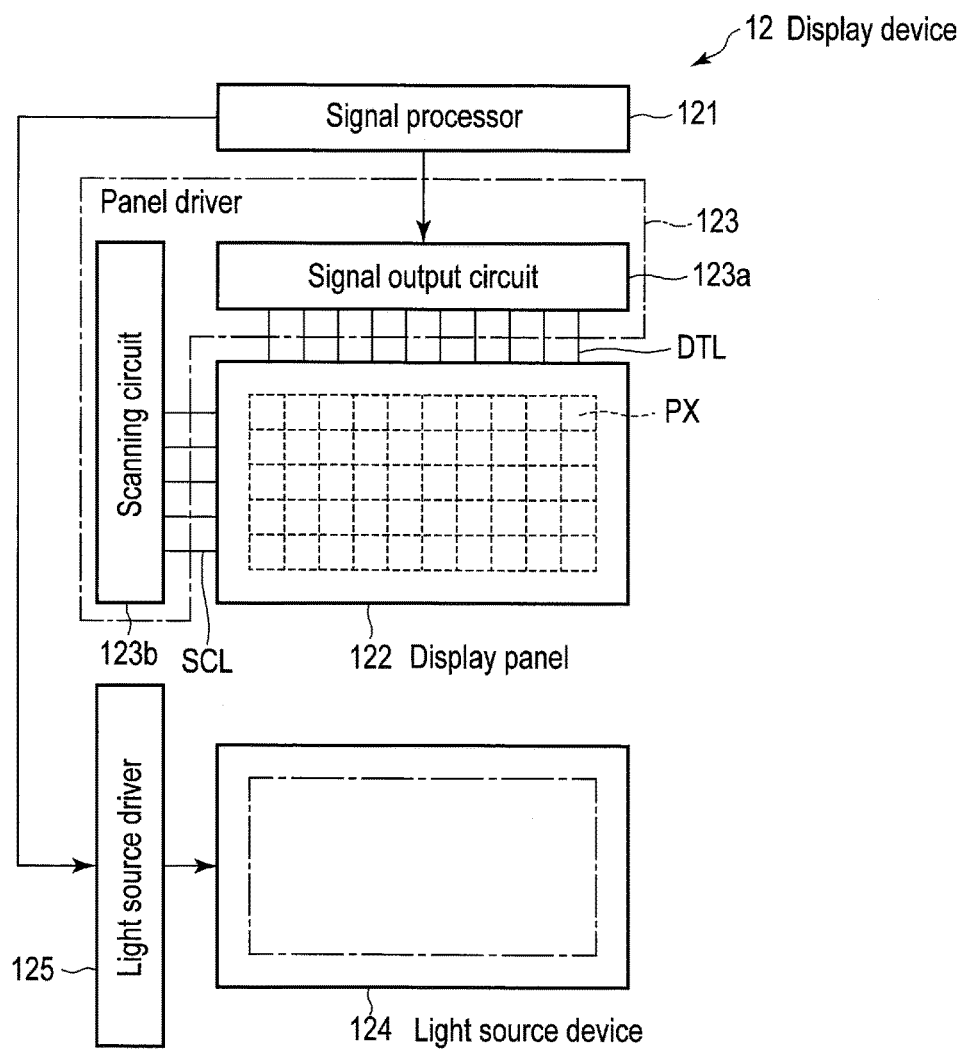
FIG. 2 is a block diagram showing an example of the configuration of a display device.

FIG. 2 is a block diagram showing an example of the configuration of the display device 12 provided in the liquid crystal display apparatus 10 shown in FIG. 1. As shown in FIG. 2, the display device 12 includes a signal processor 121, a display panel (display) 122, a panel driver 123, a light source device 124, a light source driver 125, etc.

The signal processor 121 is a calculation processor for controlling the operation of the display panel 122 and the light source device 124. The signal processor 121 is electrically connected to the panel driver 123 for driving the display panel 122 and the light source driver 125 for driving the light source device 124.

Each image signal output from the imaging circuit 11 includes, for example, the matrix of pixel data called a Bayer array. The image signal undergoes an image process (Bayer conversion) and is converted into an image signal including RGB components. This image process is performed in, for example, the image processor 13.

The image signal which underwent the above image process is input to the signal processor 121. The signal processor 121 applies a necessary process to the input image signal and outputs it to the panel driver 123 (the display panel 122).

The signal processor 121 generates a light source control signal based on the input image signal and outputs the light source control signal to the light source driver 125.

The display panel 122 includes a liquid crystal layer between two substrates facing each other. The display panel 122 includes a structure in which a plurality of pixels PX are arrayed in a two-dimensional matrix.

The panel driver 123 includes a signal output circuit 123a and a scanning circuit 123b. The signal output circuit 123a is electrically connected to the display panel 122 via signal lines DTL. The signal output circuit 123a holds the image signals output from the signal processor 121 and sequentially outputs the image signals to the display panel 122.

The scanning circuit 123b is electrically connected to the display panel 122 via scanning lines SCL. The scanning circuit 123b controls the on-off state of switching elements for selecting pixels on the display panel 122.

For example, the light source device 124 is provided on the rear side of the display panel 122 and emits light to the display panel 122.

For example, the light source driver 125 controls the amount (intensity) of the light emitted to the display panel 122 by adjusting the current supplied to the light source device 124 or the duty ratio based on the light control signals output from the signal processor 121.

In the display device 12, each image signal (including line image signals) output from the signal processor 121 is sequentially written to the pixels PX arranged in corresponding rows (in other words, corresponding display lines) on the display panel 122 irradiated with the light emitted from the light source device 124 in accordance with the operation of the panel driver 123 (including the signal output circuit 123a and the scanning circuit 123b) and the light source driver 125. In this way, an image is displayed on the display panel 122 based on an image signal. The display panel 122 includes a plurality of display lines (for example, 768 display lines). The image signal written to each display line is held (displayed) on the display line (pixels PX) until the next image signal is written.

Now, this specification briefly explains the display control of an image based on the above image signal with reference to FIG. 3.

It is assumed that the image sensors included in the imaging circuit 11 are driven in the high-sensitivity mode (first mode). When the image sensors are driven in the high-sensitivity mode, for example, the image sensors output an image signal every exposure time of 1/120 s (first exposure time) (in other words, the image sensors are driven at a drive frequency of 120 Hz). Specifically, the image sensors output the amount of light (electrical signals) stored in the image sensors by exposure in accordance with the exposure time of 1/120 s as an image signal. Each image signal output from the image sensors every exposure time of 1/120 s is a signal indicating a single frame. For example, each image signal includes a plurality of line image signals to be written to the 1st to 768th display lines.

When the image sensors are driven in the high-sensitivity mode as described above, the display device 12 displays an image in accordance with 120 Hz progressive drive (system) as shown in FIG. 3. In accordance with 120 Hz progressive drive, the image of a single frame is displayed for 1/120 s based on the image signal output from the image sensors driven in the high-sensitivity mode. In this case, the display panel 122 is driven with a refresh rate of 120 Hz (in other words, the display panel 122 is rewritten every 1/120 s).

The progressive drive refers to a system for sequentially scanning a plurality of display lines from the upper side to display the image of a single frame (in other words, a progressive scanning system). In accordance with progressive drive, the image of a single frame is displayed by a single scan.

For the sake of convenience, FIG. 3 shows that the image of a single frame is displayed. However, for example, the present embodiment assumes that a moving image is displayed by the display device 12. In this case, the display control explained in FIG. 3 is sequentially performed every time each image included in the moving image is displayed. In the following explanation, a moving image is displayed in the same manner.

When the exposure time (the amount of exposure) of the image sensors is not appropriate, the quality of the image displayed by the display device 12 may be impaired.

Specifically, when the image sensors are (in other words, the imaging circuit 11 including the image sensors is) subjected to light exposure in accordance with the exposure time (1/120 s) equal to that of FIG. 3 in an extremely light place, the amount of exposure of the image sensors is excessive. Thus, the quality of the image displayed on the liquid crystal display apparatus 10 is impaired.

In this case, the reduction in the image quality can be prevented (in other words, the image quality can be improved) by shortening the exposure time of the image sensors and decreasing the amount of exposure.

Now, this specification explains the display control of an image based on an image signal when the exposure time of the image sensors is shortened (in other words, a comparison example for the present embodiment).

It is assumed that the image sensors included in the imaging circuit 11 are driven in the high-speed mode (second mode). When the image sensors are driven in the high-speed mode, for example, the image sensors output an image signal every exposure time of 1/240 s (second exposure time) shorter than the exposure time (1/120 s) of the high-sensitivity mode (in other words, the image sensors are driven at a drive frequency of 240 Hz). Specifically, the image sensors output the amount of light (electrical signals) stored in the image sensors by exposure in accordance with the exposure time of 1/240 s as an image signal.

Figure 4:
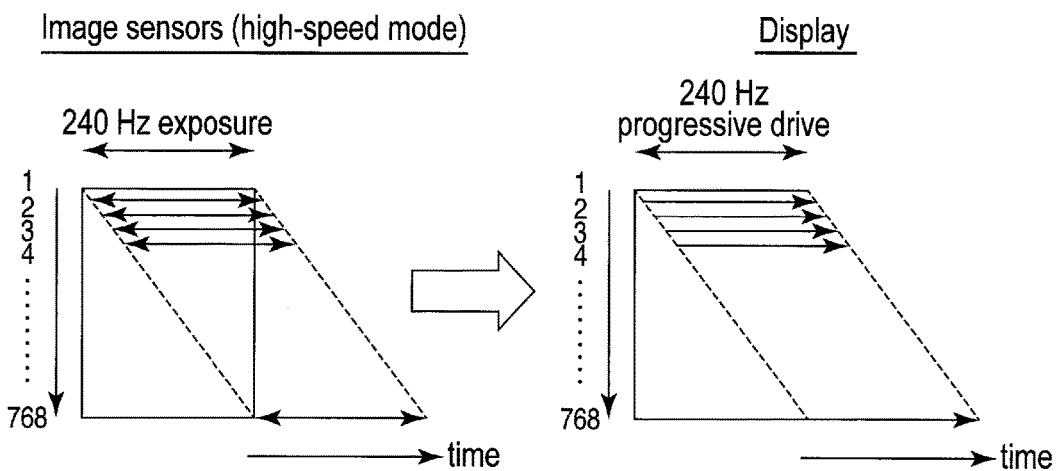
FIG. 4 is shown for explaining a comparison example for the present embodiment.

When the image sensors are driven in the high-speed mode as described above, the display device 12 displays the image of a signal frame in accordance with 240 Hz progressive drive as shown in FIG. 4. In accordance with 240 Hz progressive drive, the image of a single frame is displayed in 1/240 s based on the image signal output from the image sensors driven in the high-speed mode. In this case, the display panel 122 is driven with a refresh rate of 240 Hz (in other words, the display panel 122 is rewritten every 1/240 s).

Now, this specification explains the 120 Hz progressive drive and the 240 Hz progressive drive described above.

Figure 5:
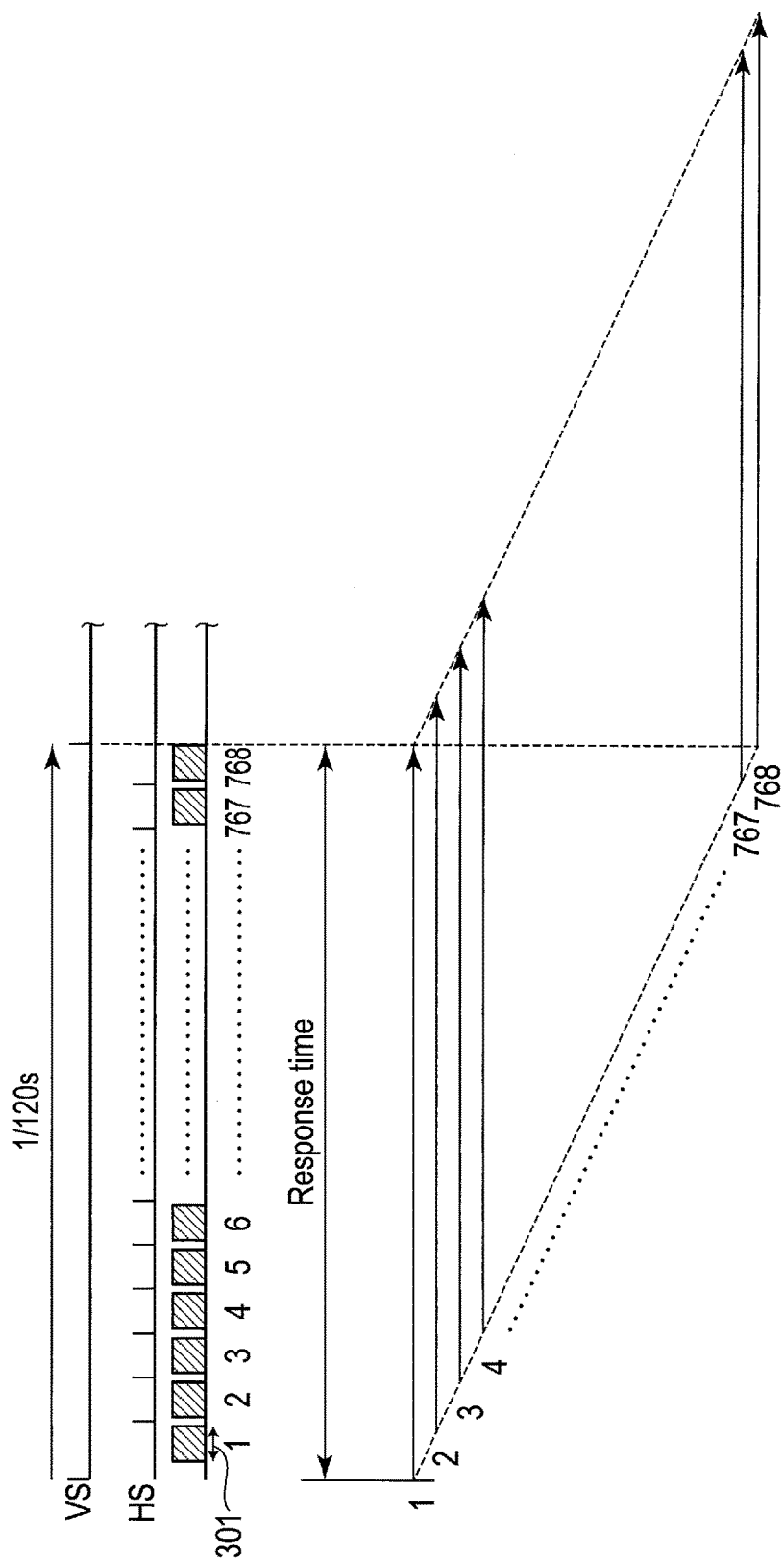
FIG. 5 is shown for explaining 120 Hz progressive drive.
Figure 6:
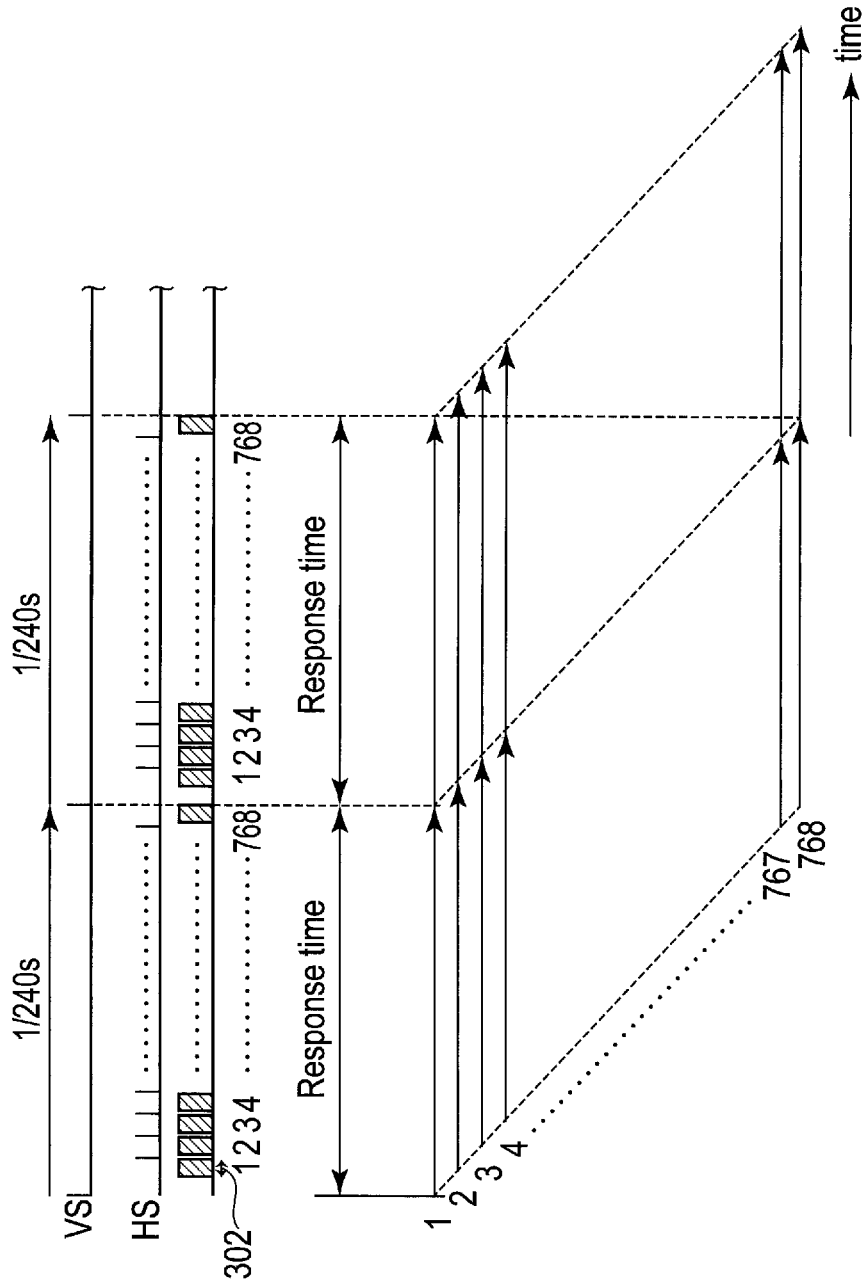
FIG. 6 is shown for explaining 240 Hz progressive drive.

FIG. 5 is shown for explaining 120 Hz progressive drive. FIG. 6 is shown for explaining 240 Hz progressive drive.

FIG. 5 and FIG. 6 show a perpendicular synchronous signal VS (VSYNC) for achieving precise timing in a perpendicular direction when an image is displayed (scanned). The display device 12 scans the display panel (display) 122 from the upper to lower side in accordance with signal VS. FIG. 5 and FIG. 6 show a horizontal synchronous signal HS (HSYNC) for achieving precise timing in a horizontal direction when an image is displayed (scanned). The display device 12 sequentially scans the display lines in accordance with signal HS.

Referring to FIG. 5, signal VS is generated (output) every 1/120 s in 120 Hz progressive drive. In accordance with 120 Hz progressive drive, the process for writing an image signal to all of the 1st to 768th display lines (in other words, the process for scanning the display panel 122 from the upper to lower side) is completed in 1/120 s.

Referring to FIG. 6, signal VS is generated (output) every 1/240 s in 240 Hz progressive drive. In accordance with 240 Hz progressive drive, the process for writing an image signal to all of the 1st to 768th display lines (in other words, the process for scanning the display panel 122 from the upper to lower side) is completed in 1/240 s.

In the 120 Hz progressive drive shown in FIG. 5, line image signals are sequentially written to the 1st to 768th display lines for 1/120 s. In the 240 Hz progressive drive shown in FIG. 6, line image signals are sequentially written to the 1st to 768th display lines for 1/240 s.

When the time for writing a line image signal to the pixels of each display line is a charging time, charging time 302 in the 240 Hz progressive drive shown in FIG. 6 is shorter than charging time 301 in the 120 Hz progressive drive shown in FIG. 5.

When the drive mode of the image sensors is changed from the high-sensitivity mode to the high-speed mode to shorten the exposure time of the image sensors, and thus, the drive state of the display device 12 is changed from 120 Hz progressive drive to 240 Hz progressive drive, the write voltage needs to be changed in accordance with the change in the charging time.

As shown in FIG. 5, in 120 Hz progressive drive, for example, the time in which the image signal written to the pixels PX arrayed as display lines is held in the pixels PX is, in other words, the time until the next image signal is written to the display lines (in other words, until the image signal is rewritten) (hereinafter, referred to as a response time) is, 1/120 s. As shown in FIG. 6, in 240 Hz progressive drive, the response time is 1/240 s.

When the drive mode of the image sensors is changed from the high-sensitivity mode to the high-speed mode, and thus, the drive state of the display device 12 is changed from 120 Hz progressive drive to 240 Hz progressive drive, the response time needs to be changed in addition to the charging time.

When the charging time and the response time are changed, the setting related to gamma (correction, etc.,) also needs to be changed in the display device 12. As a result, the display control of an image is complicated. Thus, the load on the liquid crystal display apparatus is increased.

Accordingly, the liquid crystal display apparatus 10 of the present embodiment includes a structure for appropriately performing the display control of an image without increasing the load on the liquid crystal display apparatus 10 even when the drive mode (in other words, the exposure time) of the image sensors is changed.

Figure 7:
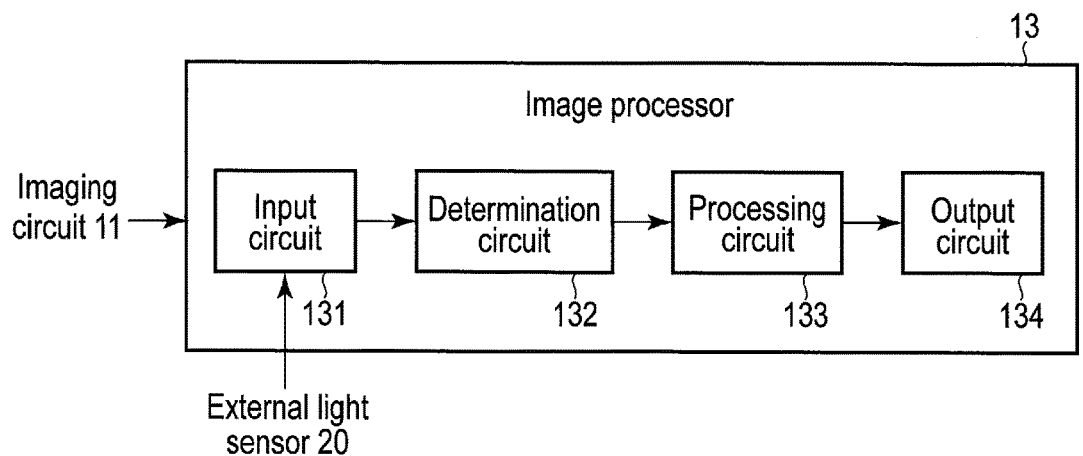
FIG. 7 is a block diagram showing an example of the functional configuration of an image processor.

With reference to FIG. 7, this specification explains an example of the functional configuration of the image processor 13 provided in the liquid crystal display apparatus 10 according to the present embodiment.

As shown in FIG. 7, the image processor 13 includes an input circuit 131, a determination circuit 132, a processing circuit 133 and an output circuit 134. These circuits 131 to 134 may be partially or entirely realized by hardware such as an integrated circuit (IC), software such as a program or a combination of hardware and software.

Each image signal output from the imaging circuit 11 (specifically, from the image sensors included in the imaging circuit 11) is input to the input circuit 131. Further, the intensity of external light detected by the external light sensor 20 is input to the input circuit 131.

The intensity of external light detected by the external light sensor 20 is also input to the imaging circuit 11. The imaging circuit 11 to which the intensity of external light is input determines the lightness or darkness around the imaging circuit 11 based on the intensity of external light, and switches the drive mode of the image sensors included in the imaging circuit 11 based on the result of determination. When the intensity (value) of external light is greater than a predetermined value (in other words, when it is light around the imaging circuit 11), the imaging circuit 11 switches the drive mode of the image sensors to the high-speed mode. When the intensity (value) of external light is less than the predetermined value (in other words, when it is dark around the imaging circuit 11), the imaging circuit 11 switches the drive mode of the image sensors to the high-sensitivity mode.

The determination circuit 132 determines the drive mode of the image sensors (in other words, the drive mode of the imaging circuit 11 after switching) based on the intensity of external light input to the input circuit 131 (in other words, based on the lightness or darkness around the imaging circuit 11). As described above, when the intensity of external light is greater than the predetermined value, the determination circuit 132 determines that the drive mode of the image sensors is the high-speed mode (in other words, the drive mode is switched to the high-speed mode). When the intensity of external light is less than the predetermined value, the determination circuit 132 determines that the drive mode of the image sensors is the high-sensitivity mode (in other words, the drive mode is switched to the high-sensitivity mode).

In the above explanation, the determination circuit 132 determines the drive mode of the image sensors based on the intensity of external light. However, the drive mode of the image sensors may be indicated by the imaging circuit 11.

The processing circuit 133 applies an image process to each image signal input by the input circuit 131 and converts the image signal into an image signal including RGB components (in other words, into a signal in a form so as to be displayed on the display device 12). After the image process is performed by the processing circuit 133, the image signal includes a plurality of line image signals to be written to the display lines (the 1st to 768th display lines) in the display device 12.

When the determination circuit 132 determines that the drive mode of the image sensors is the high-speed mode, the processing circuit 133 performs a process for removing part of the image signal obtained through the image process. Specifically, the processing circuit 133 removes the line image signals to be written to predetermined display lines from the above line image signals to be written to the 1st to 768th display lines.

The output circuit 134 outputs the image signal obtained as a result of partial removal by the processing circuit 133 to the display device 12.

When the determination circuit 132 determines that the drive mode of the image sensors is the high-sensitivity mode, the image signal obtained through the image process performed by the processing circuit 133 (in other words, the image signal including the line image signals to be written to the 1st to 768th display lines) is output to the display device 12.

The intensity of external light detected by the external light sensor 20 is also input to the display device 12. In this case, in the display device 12, the drive mode of the image sensors included in the imaging circuit 11 is determined in a manner similar to that of the determination circuit 132 included in the image processor 13.

When the drive mode of the image sensors is determined as the high-sensitivity mode, the display device 12 performs the display control of an image in accordance with the 120 Hz progressive drive explained in FIG. 3 and FIG. 5.

When the drive mode of the image sensors is determined as the high-speed mode, the display device 12 performs the display control of an image in accordance with 240 Hz interlace drive as explained later.

The interlace drive (system) refers to a system for scanning a plurality of display lines while skipping predetermined lines to display the image of a single frame (in other words, an interlaced scanning system). In accordance with interlace drive, the image of a single frame is displayed by a plurality of scans.

Figure 8:
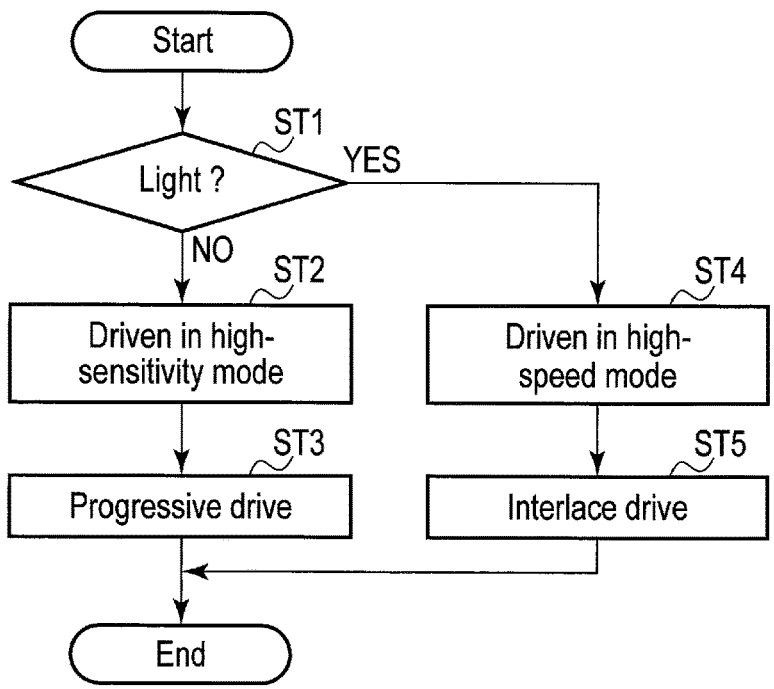
FIG. 8 is a flowchart shown for explaining the outline of the operation of the liquid crystal display apparatus.

With reference to the flowchart of FIG. 8, this specification explains the outline of the operation of the liquid crystal display apparatus 10 according to the present embodiment.

In the liquid crystal display apparatus 10, the lightness or darkness around the imaging circuit 11 is determined based on the intensity of external light detected by the external light sensor 20 (step ST1). In accordance with this determination process, as described above, when the intensity of external light is less than a predetermined value, it is determined that it is not light around the imaging circuit 11. When the intensity of external light is greater than the predetermined value, it is determined that it is light around the imaging circuit 11.

When it is determined that it is not light around the imaging circuit 11 (NO in step ST1), the image sensors are driven in the high-sensitivity mode (step ST2). When the image sensors are drive in the high-sensitivity mode, the exposure time is, for example, 1/120 s.

When it is determined that it is not light around the imaging circuit 11, the display device 12 displays an image in accordance with progressive drive (step ST3). As described above, when the exposure time of the image sensors is 1/120 s, the display device 12 operates in accordance with 120 Hz progressive drive.

When it is determined that it is light around the imaging circuit 11 (YES in step ST1), the image sensors are driven in the high-speed mode (step ST4). When the image sensors are driven in the high-speed mode, the exposure time is half the exposure time of the high-sensitivity mode, for example, 1/240 s.

When it is determined that it is light around the imaging circuit 11, the display device 12 displays an image in accordance with interlace drive (step ST5). As described above, when the exposure time of the image sensors is 1/240 s, the display device 12 operates in accordance with 240 Hz interlace drive.

Figure 9:
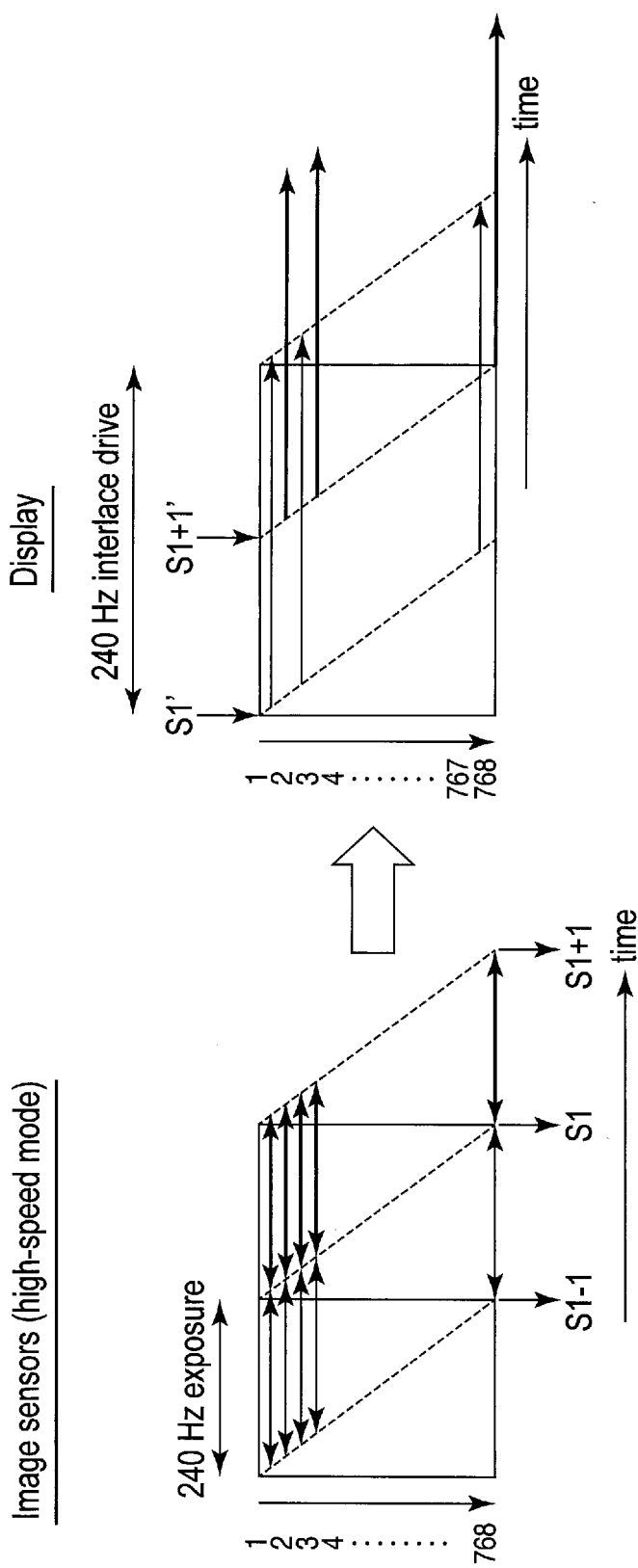
FIG. 9 is shown for explaining 240 Hz interlace drive according to the present embodiment.
Figure 10:
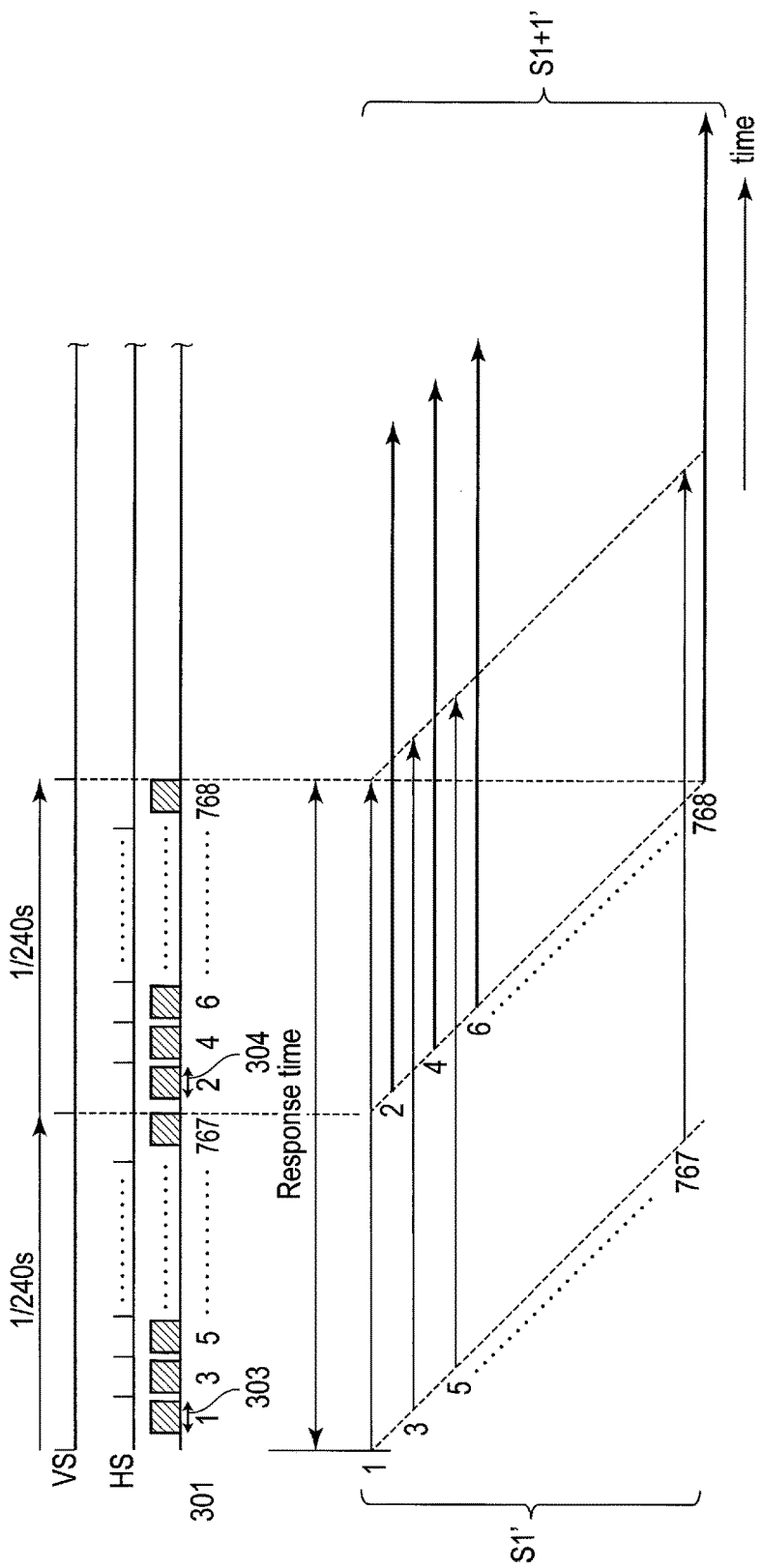
FIG. 10 is shown for explaining 240 Hz interlace drive according to the present embodiment.

With reference to FIG. 9 and FIG. 10, this specification explains 240 Hz interlace drive according to the present embodiment.

As described above, when the display device 12 displays an image in accordance with 240 Hz interlace drive, the image sensors included in the imaging circuit 11 are driven in the high-speed mode. In this case, the image sensors output an image signal every exposure time of 1/240 s as shown in FIG. 9.

In the 240 Hz interlace drive of the present embodiment, an image is displayed based on the image signal obtained by removing part of the image signal output from the image sensors for the exposure time of 1/240 s.

It is assumed that the image sensors driven in the high-speed mode sequentially output an image signal (S1−1, S1, S1+1) every 1/240 s as shown in FIG. 9. These image signals S1−1, S1 and S1+1 are part of the image signals each sequentially output every 1/240 s while the image sensors are driven in the high-speed mode. In FIG. 9, the image signals other than image signals S1−1, S1 and S1+1 are omitted.

As described above, each image signal (S1−1, S1, S1+1, etc.,) output from the image sensors includes a plurality of line image signals to be written to the display lines (the 1st to 768th display lines) in the display device 12.

In the following explanation, of the line image signals included in each image signal output from the image sensors, for example, the line image signal to be written to the 1st display line is called the line image signal of the 1st line. In this manner, the line image signal to be written to the 2nd display line is called the line image signal of the 2nd line. The line image signals to be written to the other display lines are called in this way.

It is assumed that image signal S1 is output from the image sensors 1/240 s after the output of image signal S1−1. In this case, image signal S1 is input to the input circuit 131 included in the image processor 13 and is subjected to an image process performed by the processing circuit 133.

As described above, the drive mode of the image sensors is the high-speed mode.

Therefore, the processing circuit 133 performs a process for removing part of image signal S1 obtained through the image process. It is assumed that the processing circuit 133 removes, for example, the line image signals of the even lines (2nd, 4th, 6th, . . . , 768th lines) from the line image signals of the 1st to 768th lines included in image signal S1. In this way, the processing circuit 133 generates an image signal (hereinafter, referred to as image signal S1') including the line image signals of the odd lines (1st, 3rd, 5th, . . . , 767th lines).

Image signal S1' generated by the processing circuit 133 is output to the display device 12 by the output circuit 134.

In this case, as shown in FIG. 10, the display device 12 sequentially writes the line image signals of the odd lines (1st, 3rd, 5th, . . . , 767th lines) included in image signal S1' to corresponding display lines (odd display lines).

Charging time 303 when the line image signal of each odd line included image signal S1' is written to the odd display line (the time in which each line image signal is written to a corresponding display line) is substantially equal to charging time 301 in the 120 Hz progressive drive shown in FIG. 5. In the present embodiment, the expression "substantially equal" includes a case where the two elements are completely the same as each other and a case where the two elements are substantially equal to each other. This note is also applicable to the following explanation.

The number of display lines to which image signal S1' is (specifically, the line image signals included in image signal S1' are) written by the display device 12 is half the number of display lines to which an image signal is written in the above 120 Hz progressive drive. Thus, as shown in FIG. 10, the writing operation based on image signal S1' by the display device 12 is completed in half (1/240 s) the time (1/120 s) in which writing operation is performed in the above 120 Hz progressive drive.

Returning to FIG. 9, the image sensors driven in the high-speed mode output image signal S1+1 1/240 s after the output of image signal S1. When image signal S1+1 is output from the image sensors, image signal S1+1 is input to the input circuit 131 included in the image processor 13 and is subjected to an image process performed by the processing circuit 133.

Subsequently, the processing circuit 133 performs a process for removing part of image signal S1+1 obtained through the image process. It is assumed that the processing circuit 133 removes the line image signals of the odd lines (1st, 3rd, 5th, . . . , 767th lines) from the line image signals of the 1st to 768th lines included in image signal S1+1. In this way, the processing circuit 133 generates an image signal (hereinafter, referred to as image signal S1+1') including the line image signals of the even lines (2nd, 4th, 6th, . . . , 768th lines).

As described above, image signal S1' is an image signal including the line image signals of the odd lines. Image signal S1+1' is an image signal including the line image signals of the even lines. Thus, the line image signals to be written to different display lines are removed from image signals S1 and S1+1 sequentially output from the image sensors driven in the high-speed mode (in other words, the removed lines differ depending on the image signal).

Image signal S1+1' generated by the processing circuit 133 is output to the display device 12 by the output circuit 134.

In this case, as shown in FIG. 10, the display device 12 sequentially writes the line image signals of the even lines (2nd, 4th, 6th, . . . , 768th lines) included in image signal S1+1' to corresponding display lines (even display lines).

Charging time 304 when the line image signal of each even line included in image signal S1+1' is written to the even display line (the time in which each line image signal is written to a corresponding display line) is substantially equal to charging time 301 in 120 Hz progressive drive in a manner similar to that of charging time 303.

In this case, the writing operation based on image signal S1+1' by the display device 12 is completed in 1/240 s in a manner similar to the writing operation based on image signal Sr.

Thus, in 240 Hz interlace drive, the image of a single frame is displayed (in other words, the image signals are written to all the display lines) by the writing operation based on image signal S1 (image signal S1') and image signal S1+1 (image signal S1+1'). In accordance with 240 Hz interlace drive, the image of a single frame is displayed in 1/120 s, and the display panel 122 is driven at a refresh rate of 120 Hz (in other words, the display panel 122 is rewritten every 1/120 s).

As described above, the charging time in 240 Hz interlace drive is substantially equal to that in 120 Hz progressive drive. In other words, the time for writing image signals to all the display lines in 240 Hz interlace drive is substantially equal to the time for writing image signals to all the display lines in 120 Hz progressive drive.

In 240 Hz interlace drive, the response time in the display lines (in other words, the time in which the image signals written to the pixels PX arrayed as display lines are held in the pixels PX) is 1/120 s as shown in FIG. 10.

In the 240 Hz interlace drive of the present embodiment, the charging time or response time is not different from that of the 120 Hz progressive drive applied when the image sensors are driven in the high-sensitivity mode. In other words, in the present embodiment, the period in which the display device 12 performs display operation for displaying the image of a single frame based on the charging time and response time (in other words, the refresh rate in the display panel 122) in 120 Hz progressive drive is substantially equal to that in 240 Hz interlace drive.

In the above description, this specification explains the display control of an image when image signals S1 and S1+1 are output from the image sensors (240 Hz interlace drive). However, the same display control is performed when, for example, image signals S1+2 and S1+3 (not shown) are output from the image sensors.

Specifically, for example, when image signal S1+2 is output after image signal S1+1, the display device 12 performs display control (writing operation) based on image signal S1+2' obtained by removing the line image signals of the even lines from image signal S1+2 (in other words, based on the line image signals of the odd lines). When image signal S1+3 is output after image signal S1+2, the display device 12 performs display control (writing operation) based on image signal S1+3' obtained by removing the line image signals of the odd lines from image signal S1+3 (in other words, based on the line image signals of the even lines). This process is also performed when other image signals are output.

In the liquid crystal display apparatus 10 (display device 12), for example, an image is displayed by applying voltage to the upper and lower sides of the liquid crystal layer (specifically, the pixel area of the liquid crystal layer) in accordance with an image signal to change the alignment state of liquid crystal molecules and the transmission of the liquid crystal layer. When DC drive which does not change the polarity of the applied voltage is employed in the liquid crystal display apparatus 10, the impurities in the liquid crystal layer are unevenly stored on a single side as charge, and thus, the liquid crystal is degraded. For this reason, AC drive which inverts the polarity of the applied voltage at predetermined intervals is employed in the liquid crystal display apparatus 10.

Figure 11:
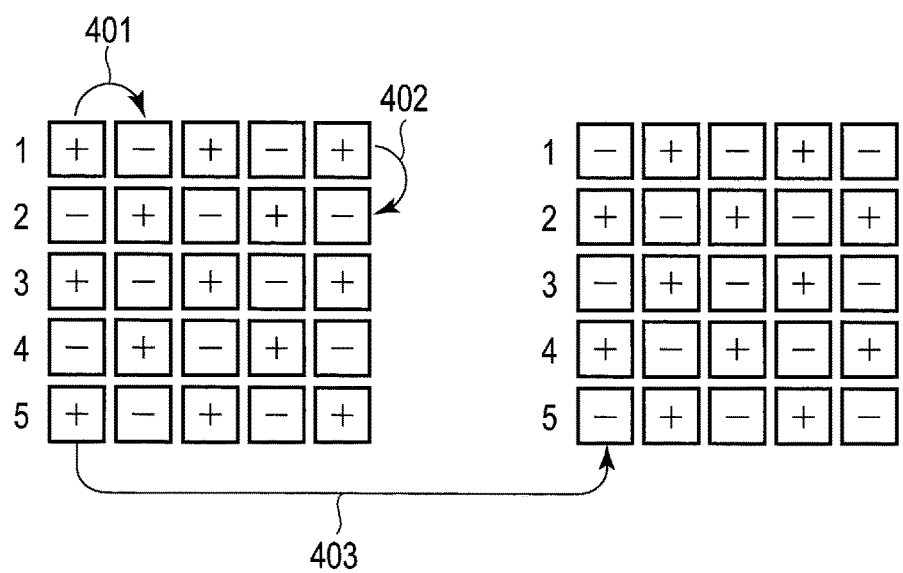
FIG. 11 shows an example of the polarity of each pixel in 120 Hz progressive drive.
Figure 12:
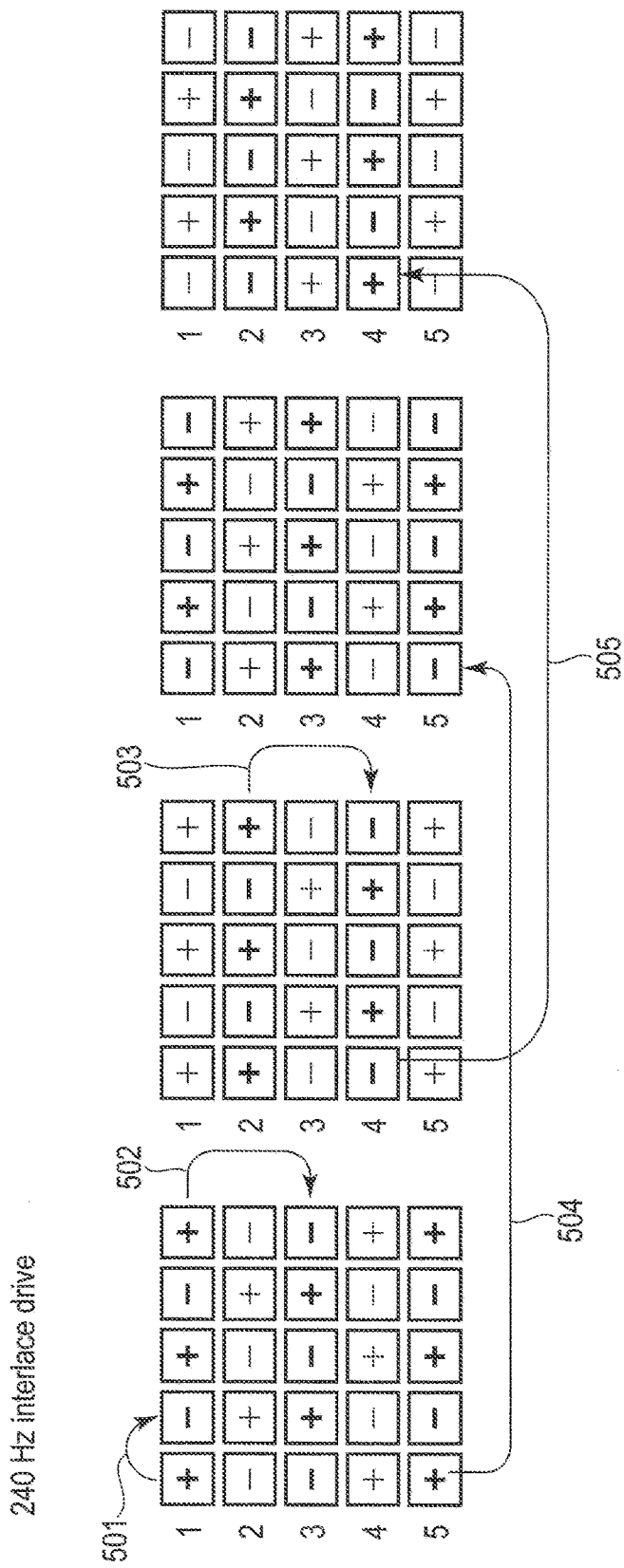
FIG. 12 shows an example of the polarity of each pixel in 240 Hz interlace drive.

With reference to FIG. 11 and FIG. 12, this specification explains examples of the polarity of the voltage to be applied to each pixel PX (specifically, the pixel area of the liquid crystal layer) (hereinafter, simply referred to as the polarity of each pixel PX).

FIG. 11 shows the polarity of each pixel PX in the above 120 Hz progressive drive. As described above, a plurality of pixels PX are arrayed in a two-dimensional matrix. As shown in FIG. 11, in 120 Hz progressive drive, the polarity is inverted between adjacent pixels PX. In other words, as indicated by arrow 401 of FIG. 11, for example, the polarity differs between adjacent pixels PX in each display line. Further, as indicated by arrow 402 of FIG. 11, the polarity differs between corresponding (adjacent) pixels PX in adjacent display lines.

In the example shown in FIG. 11, the pixels PX of the 1st display line are positive (+), negative (−), positive (+), negative (−) and positive (+). The pixels PX of the 2nd display line are negative (−), positive (+), negative (−), positive (+) and negative (−). This arrangement is also applicable to the 3rd and subsequent display lines, detailed description thereof being omitted.

As indicated by arrow 403 of FIG. 11, when the image (the image of a single frame) is rewritten in accordance with 120 Hz progressive drive, the polarity of each pixel PX is inverted (changed).

FIG. 11 only shows the 1st to 5th display lines for the sake of convenience. However, the same explanation is applicable to the other display lines.

FIG. 12 shows the polarity of each pixel PX in the above 240 Hz interlace drive. In 240 Hz interlace drive, as indicated by arrow 501 of FIG. 12, the polarity differs between adjacent pixels PX in each display line.

In accordance with 240 Hz interlace drive, as described above, the line image signals of the odd lines and the line image signals of the even lines are alternately written every 1/240 s.

It is assumed that the line image signals of the odd lines are firstly written to the display lines. As indicated by arrow 502 of FIG. 12, the polarity differs between corresponding pixels PX provided in adjacent ones of the display lines (the 1st display line, the 3rd display line, the 5th display line, . . . ) to which the line image signals are written. In this case, for example, the 1st display line is adjacent to the 3rd display line. The 3rd display line is adjacent to the 5th display line.

In the example shown in FIG. 12, the pixels PX of the 1st display line are positive (+), negative (−), positive (+), negative (−) and positive (+). The pixels PX of the 3rd display line are negative (−), positive (+), negative (−), positive (+) and negative (−). This arrangement is also applicable to the 5th and subsequent display lines, detailed description thereof being omitted.

It is assumed that the line image signals of the even lines are subsequently written to the display lines. As indicated by arrow 503 of FIG. 12, the polarity differs between corresponding pixels provided in adjacent ones of the display lines (the 2nd display line, the 4th display line, . . . ) to which the line image signals are written. In this case, for example, the 2nd display line is adjacent to the 4th display line. The 4th display line is adjacent to the 6th display line.

In the example shown in FIG. 12, the pixels PX of the 2nd display line are positive (+), negative (−), positive (+), negative (−) and positive (+). The pixels PX of the 4th display line are negative (−), positive (+), negative (−), positive (+) and negative (−). This arrangement is also applicable to the 6th and subsequent display lines, detailed description thereof being omitted.

As shown in FIG. 12, when the image (the image of a single frame) is rewritten in accordance with 240 Hz interlace drive, the polarity of each pixel PX is inverted (changed). When the line image signals of the odd lines are rewritten, as indicated by arrow 504 of FIG. 12, the polarity of each pixel PX of these display lines (the 1st display line, the 3rd display line, the 5th display line, . . . ) is inverted. When the line image signals of the even lines are rewritten, as indicated by arrow 505 of FIG. 12, the polarity of each pixel PX of these display lines (the 2nd display line, the 4th display line, . . . ) is inverted.

The polarity of each pixel PX differs depending on the display line to which an image signal is written. Further, the polarity of each pixel PX changes every time the image signal is rewritten (in other words, based on each frame).

As described above, in the present embodiment, for example, the image sensors output an image signal every 1/120 s (first exposure time) when the image sensors are driven in the high-sensitivity mode. The image sensors output an image signal every 1/240 s (second exposure time) when the image sensors are driven in the high-speed mode. When the image sensors are driven in the high-sensitivity mode, for example, the display device 12 displays an image in accordance with 120 Hz progressive drive. When the image sensors are driven in the high-speed mode, the display device 12 displays an image in accordance with 240 Hz interlace drive. Since the present embodiment has this structure, the display control of an image can be appropriately performed in terms of the load and the image quality of the liquid crystal display apparatus 10.

In the present embodiment, the period (first period) in which the display device 12 performs display operation when the image sensors are driven in the high-sensitivity mode is substantially equal to the period (second period) in which the display device 12 performs display operation when the image sensors are driven in the high-speed mode. Specifically, when the image sensors are driven in the high-speed mode, an image is displayed by performing a process for removing part of the image signal output from the image sensors.

In this structure, even when the drive mode of the image sensors is switched between the high-sensitivity mode and the high-speed mode, there is no need to change the charging time (the time for writing an image signal to each display line) or the response time (the time until the image signal is rewritten in the display lines) in the display operation of the display device 12. In this case, for example, it is unnecessary to change the setting related to gamma in accordance with the drive mode of the image sensors. Thus, it is possible to avoid complicating the process because of the change (in other words, to avoid increasing the load).

The amount of blurring of the image displayed in the above 240 Hz interlace drive is equivalent to that in 120 Hz progressive drive. However, the position of the barycenter of the image can be updated at 240 Hz (1/240 s). Thus, in the 240 Hz interlace drive of the present embodiment, even with the load (response) equivalent to that in 120 Hz progressive drive, it is possible to realize at least the performance of moving image higher than that of 120 Hz progressive drive (in other words, the performance close to that of 240 Hz progressive drive).

Figure 13:
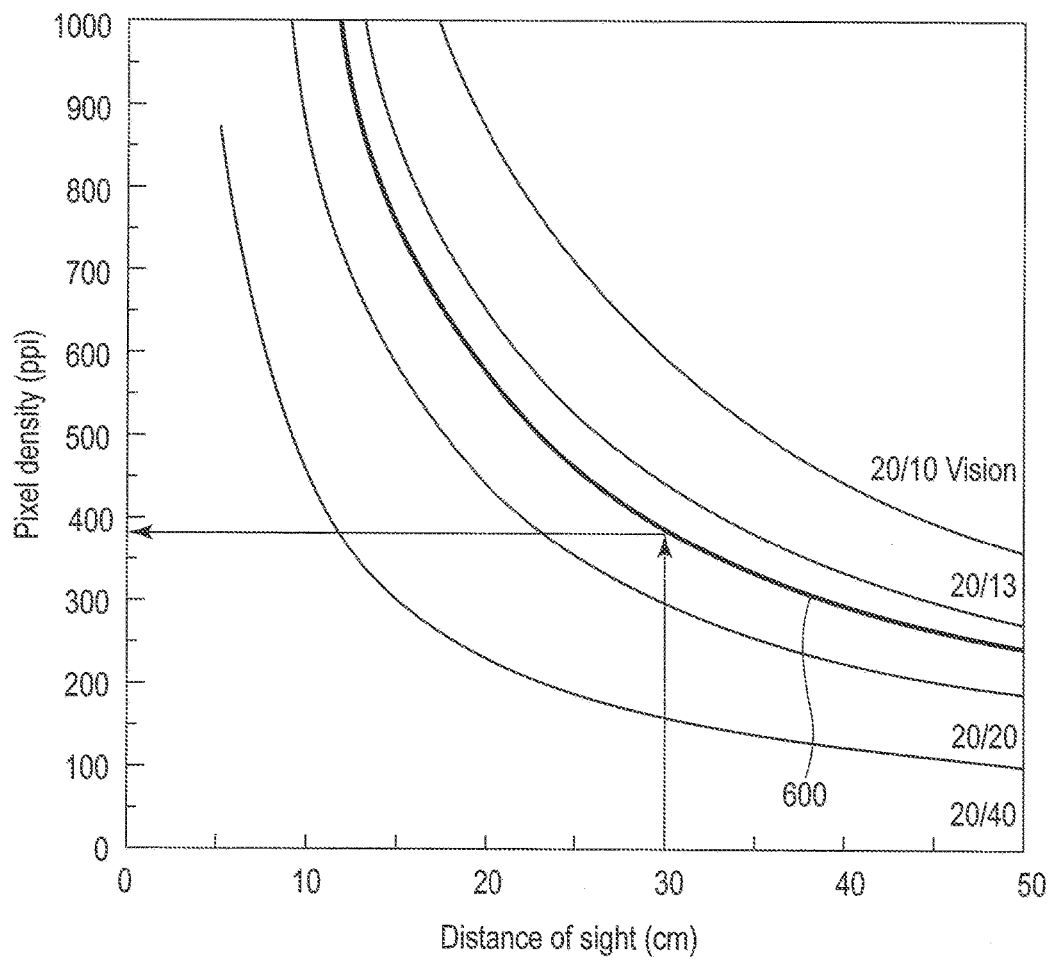
FIG. 13 shows the relationship between the pixel density and the distance of sight based on the visual acuity.

FIG. 13 is a graph showing the relationship between the pixel density (ppi) and the distance (the distance of sight) to the screen in which a person who looks at the display (the liquid crystal display apparatus 10) having the pixel density can recognize the pixels based on the visual acuity.

Here, for example, the screen is the display of a smartphone. It is assumed that the distance between the display of a smartphone and a person who looks at the display is approximately 30 cm. In FIG. 13, curve 600 represents the mean value of the visual acuity.

According to the graph, when a person having substantially the average vision looks at the display of a smartphone at a distance of 30 cm, the pixels are not recognized with a pixel density of approximately 400 ppi or greater on the display.

When an existing liquid crystal panel having a low resolution is used to perform interlace drive, jaggies are visually recognized in the displayed image. Thus, interlace drive cannot be performed in practical ways. However, when the liquid crystal display apparatus 10 is structured such that the pixel density is greater than or equal to 400 ppi as described above, the width of jaggies is reduced. Thus, the jaggies are difficult to visually recognize. By performing 240 Hz interlace drive, the image update distance of a single frame is less than that of normal 60 Hz drive. Thus, the jaggies are shortened. The jaggies are not recognized by people who look at the image displayed on the liquid crystal display apparatus 10. In the present embodiment, it is possible to reduce the effect of jaggies caused by interlace drive and display an image having high visibility for the user by driving the display panel 122 with a refresh rate of, for example, 120 Hz or greater and setting the pixel density of the display panel to 400 ppi or greater.

In the present embodiment, when the image sensors are driven in the high-sensitivity mode (in other words, when the exposure time is 1/120 s), an image is displayed in accordance with 120 Hz progressive drive. When the image sensors are driven in the high-speed mode (in other words, when the exposure time is 1/240 s), an image is displayed in accordance with 240 Hz interlace drive. However, for example, if the period in which the display device 12 performs display operation is (for example, the charging time and response time are) substantially equal regardless of the drive mode of the image sensors by displaying an image in progressive drive when the exposure time is long and displaying an image in interlace drive when the exposure time is short, the exposure time of the image sensors or the period in which the display device 12 performs display operation may differ.

For example, in the liquid crystal display apparatus 10, a process is performed based on the image signal unit for displaying the image of a single frame by using a frame buffer, etc., provided in the liquid crystal display apparatus 10 (specifically, in the elements 11 to 13 included in the liquid crystal display apparatus 10). However, the present embodiment may be applied to, for example, a low-delay system which performs a process based on the line image signal unit of a single display line instead of the image signal unit by performing control such that the elements 11 to 13 are driven in synchronization with each other.

In the present embodiment, this specification mainly explains the liquid crystal display apparatus 10. However, the present embodiment may be applied to a display apparatus such as a display using an organic light emitting diode (OLED).

Second Embodiment

A second embodiment is explained. The structure of the liquid crystal display apparatus of the present embodiment and the structures of the display device and the image processor included in the liquid crystal display apparatus are the same as those of the first embodiment. Thus, these structures are explained using FIG. 1, FIG. 2, FIG. 7, etc., where necessary. In the following description, the detailed explanation of the same portions as the first embodiment is omitted. Portions different from those of the first embodiment are mainly explained below.

The liquid crystal display apparatus 10 of the present embodiment is different from that of the first embodiment in terms of the image signals (specifically, the form of the image signals) output from the image sensors included in an imaging circuit 11.

In the present embodiment, in a manner similar to that of the first embodiment, when the image sensors are driven in a high-sensitivity mode (in other words, when the exposure time is 1/120 s), an image is displayed in accordance with 120 Hz progressive drive. When the image sensors are driven in a high-speed mode (in other words, when the exposure time is 1/240 s), an image is displayed in accordance with 240 Hz interlace drive.

The 120 Hz progressive drive of the present embodiment is the same as that of the first embodiment, detailed description thereof being omitted.

With reference to FIG. 14, the 240 Hz interlace drive of the present embodiment is explained below.

As stated above, when a display device 12 displays an image in accordance with 240 Hz interlace drive, the image sensors included in the imaging circuit 11 are driven in the high-speed mode. In this case, the image sensors output an image signal every exposure time of 1/240 s as shown in FIG. 14.

In the present embodiment, the image sensors driven in the high-speed mode output an image signal obtained by removing part of an image signal indicating the image of a single frame. Specifically, for example, the image sensors output an image signal (in other words, an image signal including the line image signals of the 1st, 3rd, 5th, . . . , 767th lines) obtained by removing the line image signals of the even lines (the 2nd, 4th, 6th, . . . , 768th lines) from the line image signals (in other words, the line image signals of the 1st to 768th lines) included in the image signal indicating the image of a single frame.

It is assumed that the image sensors sequentially output an image signal (S2−1, S2, S2+1) every 1/240 s as shown in FIG. 14. These image signals S2−1, S2 and S2+1 are part of the image signals each sequentially output every 1/240 s while the image sensors are driven in the high-speed mode. In FIG. 14, the image signals other than image signals S2−1, S2 and S2+1 are omitted.

As stated above, each image signal (S2−1, S2, S2+1, etc.,) output from the image sensors includes the line image signals of the odd lines.

It is assumed that the image sensors output image signal S2 1/240 s after the output of image signal S2−1. In this case, image signal S2 is input to an input circuit 131 included in an image processor 13, is subjected to an image process performed by a processing circuit 133 and is output to the display device 12 by an output circuit 134.

In this case, the display device 12 sequentially writes the line image signals of the odd lines (the 1st, 3rd, 5th, . . . , 767th lines) included in image signal S2 output by the output circuit 134 to corresponding display lines (odd display lines).

Although not shown in FIG. 14, the charging time when each line image signal included in image signal S2 is written to a corresponding odd display line (the time in which a line image signal is written to a single display line) is substantially equal to the charging time in the above 120 Hz progressive drive.

The number of display lines to which image signal S2 is (specifically, the line image signals included in image signal S2 are) written by the display device 12 is half the number of display lines to which an image signal is written in the above 120 Hz progressive drive. Thus, the writing operation based on image signal S2 by the display device 12 is completed in half (1/240 s) the time (1/120 s) in which writing operation is performed in 120 Hz progressive drive.

Subsequently, the image sensors driven in the high-speed mode output image signal S2+1 1/240 s after the output of image signal S2. When image signal S2+1 is output from the image sensors, image signal S2+1 is input to the input circuit 131 included in the image processor 13, is subjected to an image process performed by the processing circuit 133 and is output to the display device 12 by the output circuit 134.

Image signal S2+1 is an image signal including the line image signals of the odd lines (the 1st, 3rd, 5th, . . . , 767th lines) as described above. In this case, the display device 12 uses the line image signals of the odd lines included in image signal S2+1 (specifically, copies of the line image signals of the odd lines included in image signal S2+1) as the line image signals of the even lines. In this way, the display device 12 is capable of sequentially writing the line image signals of the even lines to the even display lines based on image signal S2+1 including the line image signals of the odd lines.

The charging time when each line image signal included in image signal S2+1 is written to a corresponding even display line (the time in which a line image signal is written to a single display line) is substantially equal to the charging time in 120 Hz progressive drive.

In this case, the writing operation based on image signal S2+1 by the display device 12 is completed in 1/240 s in a manner similar to the writing operation based on image signal S2.

Thus, in 240 Hz interlace drive, the image of a single frame is displayed (in other words, image signals are written to all the display lines) by the writing operation based on image signals S2 and S2+1. In accordance with the 240 Hz interlace drive of the present embodiment, the image of a single frame is displayed in 1/120 s, and the display panel 122 is driven with a refresh rate of 120 Hz (in other words, the display panel 122 is rewritten every 1/120 s).

As described above, the charging time in the 240 Hz interlace drive of the present embodiment is substantially equal to that in 120 Hz progressive drive. In the 240 Hz interlace drive of the present embodiment, the response time in the display lines (in other words, the time in which the image signal written to the pixels PX arrayed as display lines is held in the pixels PX) is 1/120 s.

In the 240 Hz interlace drive of the present embodiment, the charging time or response time (in other words, the period in which the display device 12 performs display operation for displaying the image of a single frame) is not different from that in the 120 Hz progressive drive applied when the image sensors are driven in the high-sensitivity mode.

In the above description, this specification explains the display control of an image when image signals S2 and S2+1 are output from the image sensors (240 Hz interlace drive). However, the same display control is performed when, for example, other image signals are output from the image sensors while they are driven in the high-speed mode.

Even when the image sensors driven in the high-speed mode output an image signal including the line image signals of the odd lines (in other words, an image signal obtained by removing the line image signals of the even lines) as described above, 240 Hz progressive drive can be realized by using, for example, the line image signals of the odd lines and the line image signals of the even lines obtained by copying the line image signals of the odd lines as an image signal indicating the image of a single frame (in other words, as the line image signals of the 1st to 768th lines) as shown in the comparison example of FIG. 15 for the present embodiment.

However, in the comparison example for the present embodiment, when the drive mode of the image sensors is changed from the high-sensitivity mode to the high-speed mode, and thus, the drive state of the display device 12 is changed from 120 Hz progressive drive to 240 Hz progressive drive, the charging time and response time need to be changed. Thus, the load on the liquid crystal display apparatus is increased.

In the present embodiment, as described above, the image sensors output an image signal indicating the image of a single frame (in other words, the line image signals of the 1st to 768th lines) when the image sensors are driven in the high-sensitivity mode (first mode). The image sensors output an image signal obtained by removing part of an image signal indicating the image of a single frame (for example, the line image signals of the 1st, 3rd, 5th, . . . , 767th lines) when the image sensors are driven in the high-speed mode (second mode).

When the image sensors are driven in the high-speed mode, the display device 12 writes line image signals to the odd display lines based on image signal S2 output earlier, and writes line image signals to the even display lines based on image signal S2+1 output later. In this way, the display device 12 displays the image of a single frame. In the present embodiment, the line image signals included in image signal S2 are allocated to the odd display lines. The line image signals included in image signal S2+1 are allocated to the even display lines.

In this structure, in a manner similar to that of the first embodiment, even when the drive mode of the image sensors is switched between the high-sensitivity mode and the high-speed mode, there is no need to change the charging time (the time for writing an image signal to each display line) or the response time (the time until the image signal is rewritten in the display lines) in the display operation of the display device 12. Thus, it is possible to avoid complicating the process because of the change (in other words, to avoid increasing the load).

Further, in the 240 Hz interlace drive of the present embodiment, in a manner similar to that of the first embodiment, it is possible to realize the performance of moving image higher than that of 120 Hz progressive drive with the same load as 120 Hz progressive drive.

In the present embodiment, the line image signals of the odd lines included in image signal S2+1 (specifically, copies of the line image signals of the odd lines included in image signal S2+1) are used as the line image signals of the even lines. However, the line image signals of the even lines may be generated by applying an averaging process to image signal S2+1 (specifically, to the line image signals of the odd lines). Specifically, the image processor 13 generates the line image signal of the 2nd line by averaging the line image signals of the 1st and 3rd lines included in image signal S2+1 (in other words, by averaging the adjacent line image signals in the odd lines). The image processor 13 generates the line image signal of the 4th line by averaging the line image signals of the 3rd and 5th lines included in image signal S2+1. The image processor 13 is capable of generating the line image signal of each even line by applying the above process to the line image signals of corresponding adjacent odd lines. In this structure, it is possible to display an image (moving image) with high quality in comparison with a case where the line image signals of the odd lines are simply used as the line image signals of the even lines.

Further, in the present embodiment, an image signal including the line image signals of the odd lines (in other words, an image signal obtained by removing the line image signals of the even lines) is output from the image sensors. However, for example, an image signal including the line image signals of the even lines (in other words, an image signal obtained by removing the line image signals of the odd lines) may be output from the image sensors.

Third Embodiment

A third embodiment is explained. The structure of the liquid crystal display apparatus of the present embodiment and the structures of the display device and the image processor included in the liquid crystal display apparatus are the same as those of the first embodiment. Thus, these structures are explained using FIG. 1, FIG. 2, FIG. 7, etc., where necessary. In the following description, the detailed explanation of the same portions as the first embodiment is omitted. Portions different from those of the first embodiment are mainly explained below.

The liquid crystal display apparatus 10 of the present embodiment is different from that of the first embodiment in terms of the image signals (specifically, the form of the image signals) output from the image sensors included in an imaging circuit 11.

In the present embodiment, in a manner similar to that of the first embodiment, when the image sensors are driven in a high-sensitivity mode (in other words, when the exposure time is 1/120 s), an image is displayed in accordance with 120 Hz progressive drive. When the image sensors are driven in a high-speed mode (in other words, when the exposure time is 1/240 s), an image is displayed in accordance with 240 Hz interlace drive.

The 120 Hz progressive drive of the present embodiment is the same as that of the first embodiment, detailed description thereof being omitted.

With reference to FIG. 16, the 240 Hz interlace drive of the present embodiment is explained below.

As stated above, when a display device 12 displays an image in accordance with 240 Hz interlace drive, the image sensors included in the imaging circuit 11 are driven in the high-speed mode. In this case, the image sensors output an image signal every exposure time of 1/240 s as shown in FIG. 16.

In the present embodiment, the image sensors driven in the high-speed mode output an image signal obtained by removing part of an image signal indicating the image of a single frame. Specifically, for example, the image sensors alternately output an image signal obtained by removing the line image signals of the even lines (the 2nd, 4th, 6th, . . . , 768th lines) and an image signal obtained by removing the line image signals of the odd lines (the 1st, 3rd, 5th, . . . , 767th lines), from the line image signals included in the image signal indicating the image of a single frame (in other words, from the line image signals of the 1st to 768th lines). In other words, in the present embodiment, the image sensors output an image signal in accordance with interlace drive (specifically, the image sensors output image signals including the line image signals of every other line and the skipped lines alternately to corresponding lines.)

In the present embodiment, the image sensors output an image signal indicating the image of a single frame (in other words, an image signal including the line image signals of the 1st to 768th lines) when the image sensors are driven in the high-sensitivity mode as described above. In other words, in the present embodiment, the image sensors driven in the high-sensitivity mode output an image signal in accordance with progressive drive (in other words, the image sensors output an image signal including the line image signals of all the lines).

Here, as shown in FIG. 16, it is assumed that the image sensors sequentially output an image signal (S3−1, S3, S3+1) every 1/240 s. These image signals S3−1, S3 and S3+1 are part of the image signals each sequentially output every 1/240 s while the image sensors are driven in the high-speed mode. In FIG. 16, the image signals other than image signals S3−1, S3 and S3+1 are omitted.

Image signals S3−1 and S3+1 are image signals obtained by removing the line image signals of the odd lines (in other words, image signals including the line image signals of the even lines). Image signal S3 is an image signal obtained by removing the line image signals of the even lines (in other words, an image signal including the line image signals of the odd lines).

It is assumed that the image sensors output image signal S3 1/240 s after the output of image signal S3−1. In this case, image signal S3 is input to an input circuit 131 included in an image processor 13, is subjected to an image process performed by a processing circuit 133 and is output to the display device 12 by an output circuit 134.

The display device 12 sequentially writes the line image signals of the odd lines (the 1st, 3rd, 5th, ..., 767th lines) included in image signal S3 output by the output circuit 134 to corresponding display lines (odd display lines).

The charging time when each line image signal included image signal S3 is written to the odd display line (the time in which a line image signal is written to a single display line) is substantially equal to the charging time in the above 120 Hz progressive drive.

The number of display lines to which image signal S3 is (specifically, the line image signals included in image signal S3 are) written by the display device 12 is half the number of display lines to which an image signal is written in accordance with 120 Hz progressive drive. Thus, the writing operation based on image signal S3 by the display device 12 is completed in half (1/240 s) the time (1/120 s) in which writing operation is performed in accordance with 120 Hz progressive drive.

Subsequently, the image sensors driven in the high-speed mode output image signal S3+1 1/240 s after the output of image signal S3. When image signal S3+1 is output from the image sensors, image signal S3+1 is input to the input circuit 131 included in the image processor 13, is subjected to an image process performed by the processing circuit 133 and is output to the display device 12 by the output circuit 134.

Image signal S3+1 is an image signal including the line image signals of the even lines (the 2nd, 4th, 6th, ..., 768th lines) as described above. In this case, the display device 12 sequentially writes the line image signals of the even lines included in image signal S3+1 output by the output circuit 134 to corresponding display lines (even display lines).

The charging time when each line image signal included in image signal S3+1 is written to a corresponding even display line (the time in which a line image signal is written to a single display line) is substantially equal to the charging time in 120 Hz progressive drive.

In this case, the writing operation based on image signal S3+1 by the display device 12 is completed in 1/240 s in a manner similar to the writing operation based on image signal S3.

Thus, in 240 Hz interlace drive, the image of a single frame is displayed (in other words, image signals are written to all the display lines) by the writing operation based on image signals S3 and S3+1. In accordance with the 240 Hz interlace drive of the present embodiment, the image of a single frame is displayed in 1/120 s, and the display panel 122 is driven with a refresh rate of 120 Hz (in other words, the display panel 122 is rewritten every 1/120 s).

As described above, the charging time in the 240 Hz interlace drive of the present embodiment is substantially equal to that in 120 Hz progressive drive. In the 240 Hz interlace drive of the present embodiment, the response time in the display lines (in other words, the time in which the image signals written to the pixels PX arrayed as display lines are held in the pixels PX) is 1/120 s.

In the 240 Hz interlace drive of the present embodiment, the charging time or response time (in other words, the period in which the display device 12 performs display operation for displaying the image of a single frame) is not different from that of the 120 Hz progressive drive applied when the image sensors are driven in the high-sensitivity mode.

In the above description, this specification explains the display control of an image when image signals S3 and S3+1 are output from the image sensors (240 Hz interlace drive). However, the same display control is performed when, for example, other image signals are output from the image sensors while they are driven in the high-speed mode.

Even when the image sensors output an image signal in accordance with interlace drive as described above, 240 Hz progressive drive can be realized by using, for example, the line image signals of the odd lines and the line image signals of the even lines obtained by copying the line image signals of the odd lines (or using the line image signals of the even lines and the line image signals of the odd lines obtained by copying the line image signals of the even lines) as an image signal indicating the image of a single frame (in other words, as the line image signals of the 1st to 768th lines) as shown in the comparison example of FIG. 17 for the present embodiment.

However, in the comparison example for the present embodiment, when the drive mode of the image sensors is changed from the high-sensitivity mode to the high-speed mode, and thus, the drive state of the display device 12 is changed from 120 Hz progressive drive to 240 Hz progressive drive, the charging time and response time need to be changed. Thus, the load on the liquid crystal display apparatus is increased.

As described above, in the present embodiment, the image sensors output an image signal in accordance with progressive drive when they are driven in the high-sensitivity mode (first mode). The image sensors output an image signal in accordance with interlace drive when they are driven in the high-speed mode (second mode).

When the image sensors are driven in the high-speed mode, the display device 12 writes line image signals to the odd display lines based on image signal S3 output earlier, and writes line image signals to the even display lines based on image signal S3+1 output later. In this way, the display device 12 displays the image of a single frame.

In this structure, in a manner similar to that of the first embodiment, even when the drive mode of the image sensors is switched between the high-sensitivity mode and the high-speed mode, there is no need to change the charging time (the time for writing an image signal to each display line) or the response time (the time until the image signal is rewritten in the display lines) in the display operation of the display device 12. Thus, it is possible to avoid complicating the process because of the change (in other words, to avoid increasing the load).

Further, in the 240 Hz interlace drive of the present embodiment, in a manner similar to that of the first embodiment, it is possible to realize the performance of moving image higher than that of 120 Hz progressive drive with the same load as 120 Hz progressive drive.

In the present embodiment, an image signal is output from the image sensors in accordance with interlace drive when 240 Hz interlace drive is applied. In this way, the image signal can be used as it is in the writing operation of the display device 12. Thus, the load on the liquid crystal display apparatus 10 can be reduced in comparison with the second embodiment.

According to at least one of the above embodiments, it is possible to provide a liquid crystal display apparatus capable of appropriately performing the display control of an image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display apparatus comprising:
an image sensor configured to output an image signal when the image sensor is driven in a first mode and a second mode; and
a liquid crystal display device comprising a liquid crystal display panel comprising a plurality of display lines, the liquid crystal display device configured to display an image on the liquid crystal display panel based on the image signal output from the image sensor, wherein
the image sensor is configured to output an image signal every first exposure time when the image sensor is driven in the first mode, and to output an image signal every second exposure time shorter than the first exposure time when the image sensor is driven in the second mode,
the liquid crystal display device is configured to display an image in accordance with progressive drive which sequentially scans the display lines based on the image signal output from the image sensor when the image sensor is driven in the first mode, and to display an image in accordance with interlace drive which scans the display lines while skipping some of the display lines based on the image signal output from the image sensor when the image sensor is driven in the second mode;
a first period in which the liquid crystal display device performs display operation for displaying an image of each frame in accordance with the progressive drive is substantially equal to a second period in which the liquid crystal display device performs display operation for displaying an image of each frame in accordance with the interlace drive;
the image sensor is configured to output an image signal indicating an image of a single frame every first exposure time when the image sensor is driven in the first mode, and
the image sensor is configured to output an image signal obtained by removing part of an image signal indicating an image of a single frame every second exposure time when the image sensor is driven in the second mode.

2. The liquid crystal display apparatus of claim 1, further comprising an image processor configured to remove part of the image signal output from the image sensor driven in the second mode when the image sensor is driven in the second mode, wherein
the liquid crystal display device is configured to display an image based on an image signal obtained as a result of partial removal.

3. The liquid crystal display apparatus of claim 1, further comprising an image processor configured to apply an averaging process to the image signal output from the image sensor when the image sensor is driven in the second mode, wherein
the liquid crystal display device is configured to display an image based on the image signal which underwent the averaging process.

4. The liquid crystal display apparatus of claim 1, wherein the image sensor is configured to output an image signal in accordance with progressive drive when the image sensor is driven in the first mode, and the image sensor is configured to output an image signal in accordance with interlace drive when the image sensor is driven in the second mode.

5. The liquid crystal display apparatus of claim 1, wherein the liquid crystal display apparatus is electrically connected to an external light sensor configured to detect intensity of light around the liquid crystal display apparatus, and
a drive mode is switched between the first mode and the second mode based on the intensity of light detected by the external light sensor.

6. A liquid crystal display apparatus comprising:
a liquid crystal display device comprising a liquid crystal display panel comprising a plurality of display lines, the liquid crystal display device configured to display an image on the liquid crystal display panel in accordance with progressive drive which sequentially scans the display lines and interlace drive which scans the display lines while skipping some of the display lines based on an image signal output from an image sensor, wherein
a first period in which the liquid crystal display device performs display operation for displaying an image of each frame in accordance with the progressive drive is substantially equal to a second period in which the liquid crystal display device performs display operation for displaying an image of each frame in accordance with the interlace drive;
the image signal output from the image sensor is an image signal obtained by removing part of an image signal indicating an image of a single frame, and
the liquid crystal display device is configured to display an image in accordance with the interlace drive based on the image signal obtained as a result of partial removal.

7. The liquid crystal display apparatus of claim 6, further comprising an image processor configured to remove part of the image signal, wherein
the liquid crystal display device is configured to display an image in accordance with the interlace drive based on an image signal obtained as a result of partial removal.

8. The liquid crystal display apparatus of claim 6, further comprising an image processor configured to apply an averaging process to the image signal output from the image sensor, wherein
the liquid crystal display device is configured to display an image in accordance with the interlace drive based on the image signal which underwent the averaging process.

9. A liquid crystal display apparatus comprising:
a liquid crystal display device comprising a liquid crystal display panel comprising a plurality of display lines, the liquid crystal display device configured to display an image on the liquid crystal display panel in accordance with interlace drive which scans the display lines while skipping some of the display lines based on an image signal output from an image sensor, wherein
the liquid crystal display panel is driven with a refresh rate of 120 Hz or greater and has a pixel density of 400 ppi or greater;
the image signal output from the image sensor is an image signal obtained by removing part of an image signal indicating an image of a single frame, and the liquid crystal display device is configured to display an image in accordance with the interlace drive based on an image signal obtained as a result of partial removal.

10. The liquid crystal display apparatus of claim 9, further comprising an image processor configured to remove part of the image signal, wherein
the liquid crystal display device is configured to display an image in accordance with the interlace drive based on an image signal obtained as a result of partial removal.

11. The liquid crystal display apparatus of claim 9, further comprising an image processor configured to apply an averaging process to the image signal output from the image sensor, wherein
the liquid crystal display device is configured to display an image in accordance with the interlace drive based on the image signal which underwent the averaging process.

* * * * *